(12) United States Patent
Kraemer et al.

(10) Patent No.: US 11,003,775 B2
(45) Date of Patent: May 11, 2021

(54) METHODS FOR BEHAVIORAL DETECTION AND PREVENTION OF CYBERATTACKS, AND RELATED APPARATUS AND TECHNIQUES

(71) Applicant: Carbon Black, Inc., Waltham, MA (US)

(72) Inventors: Jeffrey Albin Kraemer, Wellesley, MA (US); Adam Karol Malinowski, Arlington, MA (US)

(73) Assignee: Carbon Black, Inc., Waltham, MA (US)

( * ) Notice: Subject to any disclaimer, the term of this patent is extended or adjusted under 35 U.S.C. 154(b) by 231 days.

(21) Appl. No.: 16/128,474

(22) Filed: Sep. 11, 2018

(65) Prior Publication Data
US 2019/0121978 A1    Apr. 25, 2019

Related U.S. Application Data

(60) Provisional application No. 62/557,132, filed on Sep. 11, 2017.

(51) Int. Cl.
*G06F 21/56* (2013.01)
*G06F 21/55* (2013.01)
*H04L 29/06* (2006.01)

(52) U.S. Cl.
CPC .......... *G06F 21/565* (2013.01); *G06F 21/554* (2013.01); *G06F 21/566* (2013.01); *H04L 63/1433* (2013.01); *G06F 21/568* (2013.01); *G06F 2221/034* (2013.01); *G06F 2221/2107* (2013.01)

(58) Field of Classification Search
None
See application file for complete search history.

(56) References Cited

U.S. PATENT DOCUMENTS

| | | | |
|---|---|---|---|
| 8,555,385 B1 | 10/2013 | Bhatkar et al. | |
| 9,317,686 B1 | 4/2016 | Ye et al. | |
| 9,514,309 B1* | 12/2016 | Mann | G06F 21/60 |
| 10,210,330 B1* | 2/2019 | Chen | G06F 21/554 |
| 2009/0126015 A1* | 5/2009 | Monastyrsky | G06F 21/566 |
| | | | 726/23 |
| 2009/0126016 A1 | 5/2009 | Sobko et al. | |
| 2015/0172300 A1 | 6/2015 | Cochenour | |

(Continued)

*Primary Examiner* — Henry Tsang

(57) ABSTRACT

A security engine may use event-stream processing and behavioral techniques to detect ransomware. The engine may detect process behavior associated with encrypting a file, encrypting a storage device, or disabling a backup file, and may assign a ransomware category to the process based thereon. The engine may initiate protection actions to protect system resources from the process, which may continue to execute. The engine may monitor the process for specific behavior corresponding to its ransomware category. Based on the extent to which such specific behavior is detected, the engine may determine that the process is not ransomware, assign a ransomware subcategory to the process, or adjust the process's threat score. Monitoring of the process may continue, and the threat score may be updated based on the process's behavior. If the threat score exceeds a threshold corresponding to the ransomware category (or subcategory), a corresponding policy action may be initiated.

20 Claims, 12 Drawing Sheets

(56) References Cited

U.S. PATENT DOCUMENTS

| | | | |
|---|---|---|---|
| 2015/0205962 A1 | 7/2015 | Swidowski et al. | |
| 2016/0042179 A1 | 2/2016 | Weingarten et al. | |
| 2016/0337390 A1* | 11/2016 | Sridhara | H04W 12/1208 |
| 2017/0024561 A1 | 1/2017 | Hajmasan et al. | |
| 2017/0223031 A1* | 8/2017 | Gu | H04L 63/1416 |
| 2017/0230179 A1* | 8/2017 | Mannan | H04L 9/0897 |
| 2017/0270293 A1* | 9/2017 | Gu | G06F 21/566 |
| 2017/0300690 A1 | 10/2017 | Ladnai et al. | |
| 2018/0018458 A1 | 1/2018 | Schmugar et al. | |
| 2018/0034835 A1* | 2/2018 | Iwanir | H04L 63/1425 |
| 2018/0114020 A1 | 4/2018 | Hirschberg et al. | |
| 2018/0121650 A1* | 5/2018 | Brown | G06F 21/561 |
| 2019/0228153 A1* | 7/2019 | Scaife | G06F 21/6218 |

* cited by examiner

METHODS FOR BEHAVIORAL DETECTION AND PREVENTION OF CYBERATTACKS, AND RELATED APPARATUS AND TECHNIQUES

CROSS-REFERENCE TO RELATED APPLICATION(S)

This application claims priority to and the benefit of U.S. Provisional Patent Application Ser. No. 62/557,132, titled "Methods for Behavioral Detection and Prevention of Cyberattacks, and Related Apparatus and Methods", which is hereby incorporated by reference herein in its entirety.

FIELD OF INVENTION

The present disclosure relates generally to computer security systems and techniques. Some embodiments described herein relate specifically to detection and prevention of ransomware-based attacks on endpoint devices (e.g., desktops, laptops, terminals, servers, embedded systems, etc.).

BACKGROUND

As the Internet and other networked computer systems become increasingly integrated into public activities (e.g., management and operation of governmental organizations) and private activities (e.g., personal activities, management and operation of households and businesses, etc.), cybersecurity threats pose an increasingly significant threat to such pursuits. Some examples of cybersecurity threats include malicious software ("malware") and ransomware (collectively, "threatware"). Malware generally operates to disrupt operation of computer systems (e.g., by taking control of computational resources and using those resources for unauthorized purposes, by disabling individual computers or entire networks, by damaging or otherwise sabotaging system components, etc.) and/or to steal resources from computer systems (e.g., by gathering sensitive data). Malware can be deployed in many forms, including computer viruses, worms, trojan horses, spyware, adware, scareware, keystroke loggers, rootkits, bots, crimeware, phishing scams, etc.

Computer users devote significant resources to detecting cybersecurity threats and preventing such threats from disrupting the operations of their computer systems or stealing their computer-based resources. Conventional cybersecurity engines have relied extensively on static, signature-based techniques for detecting malware. In general, static, signature-based malware detection involves obtaining a copy of a file that is known to contain threatware, analyzing the static features of the file (e.g., the sequence of bytes contained in the file) to extract a static signature that is characteristic of the threatware, and adding the threatware's static signature to a database (often referred to as a "blacklist") of known cybersecurity threats. When a user attempts to access (e.g., download, open, or execute) a file, the cybersecurity engine scans the file and extracts the file's static signature. If the file's static signature matches a signature on the blacklist, the cybersecurity engine detects the presence of a threat and intervenes to prevent the threatware from executing (e.g., by quarantining or deleting the file).

Static, signature-based techniques for detecting threatware are generally useful for quickly detecting known threats. However, these techniques can generally be circumvented by new threats that are not yet blacklisted (e.g., zero-day threatware or next-generation threatware) or by threatware that modifies itself to avoid matching a static signature on the blacklist (e.g., oligomorphic, polymorphic, or metamorphic threatware).

Some cybersecurity engines rely on behavior-based techniques for detecting cybersecurity threats. In general, behavior-based threat detection involves monitoring the execution of a computational unit (e.g., a thread, a process, an application, etc.) and identifying suspicious features of the computational unit's execution (e.g., suspicious behaviors, which may include unpacking code, modifying the host file, logging keystrokes, etc.). When suspicious behaviors are identified, the cybersecurity engine intervenes to protect the computer system (e.g., by terminating or quarantining the computational unit) and assess the threat (e.g., by initiating a forensic investigation of the computational unit, etc.). Behavior-based threatware detection techniques can protect computer systems from certain types of threats (for example, zero-day threatware and self-modifying threatware) that are difficult to detect using blacklists of static signatures.

The spectrum of potential threats ("threatscape") posed by threatening software (e.g., malware, ransomware, etc.) continues to evolve rapidly. Ransomware, for example, has quickly evolved to become one of the most threatening attack methods used by modern cybercriminals and one of the most significant cybersecurity challenges facing organizations that rely on enterprise computing. "Ransomware" generally refers to a type of software that threatens to publish or perpetually block access to a computer user's data unless the user pays a ransom to an attacker. Access to the user's data is generally blocked by encrypting the user's files or storage devices without providing the decryption key to the user.

SUMMARY OF THE INVENTION

Behavior-based threatware detection techniques can protect computer systems from certain types of threatware (for example, zero-day threatware and self-modifying threatware) that are difficult to detect using blacklists of static signatures. However, behavior-based threatware detection techniques can place significant demands on the host computer system's resources, and can therefore substantially degrade the host computer system's performance. For example, a cybersecurity engine that performs behavior-based threatware detection may track a substantial portion of the behavior of a substantial fraction of the computational units executing on a computer system (e.g., by monitoring the execution of the computational units, detecting behaviors of interest, and/or generating tracking data indicative of such behaviors). Such tracking can consume a significant portion of the computer system's computing resources (e.g., processor cycles, storage space, communication bandwidth, etc.).

Another problem associated with behavior-based threatware detection techniques relates to a tradeoff between false negative outcomes (e.g., erroneously classifying threatware as benign software) and false positive outcomes (e.g., erroneously classifying benign software as threatware). A cybersecurity engine that produces too many false negative outcomes may fail to detect threatware, rendering the engine ineffective and exposing the computer system to dangerous attacks. On the other hand, an engine that produces too many false positive outcomes may identify legitimate software as suspicious and initiate unnecessary interventions (e.g., forensic investigations) that disrupt the legitimate activities of a user or an organization. Initiating unnecessary interventions also wastes resources, including computing resources, energy resources (e.g., electrical power), human resources (e.g., the time and attention of security experts), and others.

Thus, techniques are needed for (1) reducing the amount of computing resources used for behavioral detection of ransomware, and/or (2) reducing the false positive rate of behavioral ransomware detection techniques without increasing (or without significantly increasing) the false negative rate of ransomware detection. The inventors have recognized and appreciated that the aforementioned improvement(s) in the efficiency of behavioral ransomware detection can be achieved using the following, adaptive technique. Initially, a security engine may monitor a computational entity for behavior associated with encrypting a file, encrypting a storage device, and/or disabling a backup file. If such behavior is detected, the security engine may assign a potential ransomware category to the computational entity based on the detected behaviors. Optionally, after assigning a potential ransomware category, the security engine may initiate protection actions to protect storage resources of the computer system from potentially malicious behaviors of the computational entity, which may continue to execute. The security engine may then monitor the computational entity for specific behavior corresponding to the assigned ransomware category. Based on the extent to which such specific behavior is (or is not) detected, the security engine may determine that the computational entity is not ransomware, or may assign a potential ransomware subcategory and a ransomware score to the computational entity. In the latter case, monitoring of the computational entity for behavior specific to the assigned ransomware category (and/or subcategory) may continue, and the ransomware score may be updated from time to time based on the extent to which such behavior is (or is not) detected. If the ransomware score exceeds a threshold corresponding to the ransomware category (and/or subcategory), a mitigation action associated with the ransomware subcategory may be initiated.

In this way, the tracking of the computational entity's behavior and the interpretation of the tracked behavior (e.g., the determination as to whether the software is ransomware or not) may both be tailored based on what is already known about the computational entity, thereby achieving lower resource utilization and/or a lower rate of false positives than conventional techniques.

In general, one innovative aspect of the subject matter described in this specification can be embodied in a computer-implemented method for ransomware detection, including: based on first events initiated by a computational entity in a computer system, detecting one or more instances of the computational entity engaging in one or more first behaviors associated with encrypting a file, encrypting a storage device, and/or disabling a backup of at least a portion of the computer system; assigning at least one potential ransomware category to the computational entity based on the detected instances of the first behaviors; and after assigning the potential ransomware category to the computational entity, initiating one or more protection actions to protect one or more storage resources against one or more modification operations, and based on second events initiated by the computational entity, detecting one or more instances of the computational entity engaging in one or more second behaviors corresponding to the potential ransomware category.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the first behaviors associated with encrypting a file include enumerating directories of a file system and/or modifying a private file, the first behaviors associated with encrypting a storage device include modifying the storage device, and the first behaviors associated with disabling a backup of at least a portion of the computer system include disabling and/or deleting a backup file, wherein the backup file stores backup data for a plurality of files and/or settings of the computer system.

In some embodiments, detecting the instance of the computational entity enumerating directories of a storage device includes detecting an enumeration operation initiated by the computational entity on a specified first directory, wherein the specified first directory is (1) a top-level directory of the storage device, (2) a user directory in a file system of the storage device, or (3) an immediate subdirectory of a user directory in the file system of the storage device. In some embodiments, a second directory is nested within the first directory, and detecting the instance of the computational entity enumerating directories of the storage device further includes: detecting an enumeration operation initiated by the computational entity on the second directory; and detecting a file modification operation initiated by the computational entity, wherein the file modification operation targets a particular file in the second directory. In some embodiments, detecting the instance of the computational entity enumerating directories of the storage device further includes: for each intermediate directory in a nesting hierarchy between the first directory and the second directory, detecting an enumeration operation initiated by the computational entity on the intermediate directory. In some embodiments, the top-level directory of the storage device is a mount point of the storage device. In some embodiments, the storage device is an external storage device or a network storage device.

In some embodiments, detecting the instance of the computational entity modifying a storage device includes detecting the computational entity (1) bypassing an operating system of the computer system when accessing the storage device, (2) writing to one or more specified regions of the storage device, and/or (3) modifying one or more file system structures of the storage device. In some embodiments, the specified regions of the storage device include a master boot record (MBR) sector of the storage device and/or a partition table of the storage device. In some embodiments, the file system structures of the storage device include a file system structure pointer and/or an inode. In some embodiments, detecting the instance of the computational entity modifying a private file includes detecting a file modification operation initiated by the computational entity, wherein the file modification operation targets a particular file that is private to a different computational entity.

In some embodiments, assigning the potential ransomware category to the computational entity based on the detected instances of the first behaviors includes: assigning a first category to the computational entity if the detected instances include an instance of the first behavior associated with encrypting a file; assigning a second category to the computational entity if the detected instances include an instance of the first behavior associated with encrypting a storage device; and assigning a third category to the computational entity if the detected instances include an instance of the first behavior associated with disabling a backup of at least a portion of the computer system. In some embodiments, the potential ransomware category assigned to the computational entity is the first category, the modification operations include one or more file modification operations targeting one or more files, and the protection actions include intercepting the file modification operations and creating backup copies of the files before permitting the file modification operations to modify the files. In some embodiments, permitting the file modification operations to modify the files includes permitting the file modification operations to encrypt the files.

In some embodiments, the potential ransomware category assigned to the computational entity is the second category, the modification operations include one or more storage device modification operations targeting one or more storage devices, and the protection actions include preventing the storage device modification operations from executing. In some embodiments, preventing the storage device modification operations from executing includes preventing the storage device modification operations from (1) bypassing an operating system of the computer system when accessing a storage device, (2) writing to one or more specified regions of the storage device, and/or (3) modifying one or more file system structures of the storage device. In some embodiments, the specified regions of the storage device include a master boot record (MBR) sector of the storage device and/or a partition table of the storage device. In some embodiments, the file system structures of the storage device include a file system structure pointer and/or an inode.

In some embodiments, the potential ransomware category assigned to the computational entity is the third category, the modification operations include one or more file modification operations targeting one or more backup files, and the protection actions include intercepting the file modification operations and creating backup copies of the backup files before permitting the file modification operations to modify the backup files.

The actions of the method may further include assigning at least one potential ransomware subcategory to the computational entity based on the detected instances of the second behaviors. In some embodiments, the potential ransomware category assigned to the computational entity is the first category, and the second behaviors corresponding to the first category include a second behavior associated with encrypting files in-place, a second behavior associated with encrypting files out-of-place, a second behavior associated with encrypting files using a single computational unit, and/or a second behavior associated with encrypting files using a plurality of related computational units. In some embodiments, the second behavior associated with encrypting files in-place includes modifying a file not created by the computational entity. In some embodiments, the second behavior associated with encrypting files out-of-place includes creating a copy of a file not created by the computational entity, modifying the copy, and deleting the file not created by the computational entity. In some embodiments, the potential ransomware category assigned to the computational entity is the second category, and the second behaviors corresponding to the second category include (1) attempting to modify a master boot record (MBR) of the storage device wherein the storage device is a bootable storage device, and/or (2) attempting to modify a file system structure of the storage device wherein the storage device is a non-bootable storage device.

The actions of the method may further include assigning a score to the computational entity based on the assigned potential ransomware category, the assigned potential ransomware subcategory, and/or the detected instances of the second behaviors. In some embodiments, assigning the score to the computational entity includes setting the score to an initial value based on the assigned potential ransomware category. In some embodiments, the potential ransomware category assigned to the computational entity is the first category, detecting the computational entity engaging in the instance of the second behavior includes detecting an increase in a number of files modified by the computational entity, an increase in a number of distinct file type classes associated with files modified by the computational entity, and/or an increase in a rate of file modification by the computational entity, and assigning the score to the computational entity includes increasing the score based on the increased number of modified files, the increased number of distinct file type classes, and/or the increased rate of file modification.

In some embodiments, the potential ransomware category assigned to the computational entity is the first category, the second behavior includes the computational entity modifying a name of a file, modifying a header of a file, and/or modifying a file such that a file header and a file extension of the modified file are inconsistent with each other, and assigning the score to the computational entity includes increasing the score based on the detected instances of the second behaviors. In some embodiments, the potential ransomware category assigned to the computational entity is the first category and the potential ransomware subcategory assigned to the computational entity indicates that the computational entity performs in-place encryption, the second behavior includes modifying a particular amount of data in a plurality of files, modifying data at a particular offset in a plurality of files, and/or writing particular data to a plurality of files, and assigning the score to the computational entity includes increasing the score based on the detected instances of the second behaviors.

In some embodiments, the potential ransomware category assigned to the computational entity is the first category and the potential ransomware subcategory assigned to the computational entity indicates that the computational entity performs out-of-place encryption, the second behavior includes specifying file extensions of a plurality of files such that the specified file extensions are all identical to each other or all different from each other, and assigning the score to the computational entity includes increasing the score based on the detected instances of the second behaviors. In some embodiments, the second behavior includes persistently scheduling the computational entity, creating a network connection, querying the computer system for system information, exhibiting suspicious provenance, obfuscating the computational entity, and/or parallelizing the computational entity, and assigning the score to the computational entity includes increasing the score based on the detected instances of the second behaviors.

In some embodiments, the potential ransomware category assigned to the computational entity is the first category, the second behavior includes modifying files of a sanctioned file type, modifying files in a temporary file storage area, and/or modifying private files of the computational entity, and assigning the score to the computational entity includes decreasing the score based on the detected instances of the second behaviors. In some embodiments, determining whether the assigned score exceeds a threshold score associated with the assigned potential ransomware subcategory, and if so, initiating a mitigation action associated with the ransomware subcategory. In some embodiments, the mitigation action includes terminating execution of the computational entity, preventing the computational entity from accessing a communication network, preventing the computational entity from modifying the storage resources, and/or replacing one or more files modified by the computational entity with respective backup files.

In some embodiments, the computational entity includes a single computational unit or a plurality of related computational units, wherein each computational unit is a thread, a process, or an application. In some embodiments, the modification operations are initiated by the computational entity.

In general, another innovative aspect of the subject matter described in this specification can be embodied in a computer-implemented method for ransomware detection, including: based on first events initiated by a computational entity in a computer system, detecting one or more instances of the computational entity engaging in one or more first behaviors associated with encrypting a file, encrypting a storage device, and/or disabling a backup of at least a portion of the computer system; assigning at least one potential ransomware category to the computational entity based on the detected instances of the first behaviors; and after assigning the potential ransomware category to the computational entity, based on second events initiated by the computational entity, detecting one or more instances of the computational entity engaging in one or more second behaviors corresponding to the potential ransomware category, assigning at least one potential ransomware subcategory to the computational entity based on the detected instances of the second behaviors, assigning a score to the computational entity based on the assigned potential ransomware category, the assigned potential ransomware subcategory, and/or the detected instances of the second behaviors, and determining whether the assigned score exceeds a threshold score associated with the assigned potential ransomware subcategory, and if so, initiating a mitigation action associated with the ransomware subcategory.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, each of the first behaviors is selected from a group including enumerating directories of a storage device, modifying a private file, modifying a storage device, and disabling a backup of at least a portion of the computer system.

The actions of the method may further include, after assigning the potential ransomware category to the computational entity, initiating one or more protection actions to protect one or more storage resources against one or more modification operations. In some embodiments, the modification operations are initiated by the computational entity. In some embodiments, assigning the potential ransomware category to the computational entity based on the detected instances of the first behaviors includes: assigning a first category to the computational entity if the detected instances include an instance of the first behavior associated with encrypting a file; assigning a second category to the computational entity if the detected instances include an instance the first behavior associated with encrypting a storage device; and assigning a third category to the computational entity if the detected instances include an instance of the first behavior associated with disabling a backup of at least a portion of the computer system.

In some embodiments, the potential ransomware category assigned to the computational entity is the first category, the modification operations include one or more file modification operations targeting one or more files, and the protection actions include intercepting the file modification operations and creating backup copies of the files before permitting the file modification operations to modify the files. In some embodiments, the potential ransomware category assigned to the computational entity is the second category, the modification operations include one or more storage device modification operations targeting one or more storage devices, and the protection actions include preventing the storage device modification operations from executing. In some embodiments, the potential ransomware category assigned to the computational entity is the third category, the modification operations include one or more file modification operations targeting one or more backup files, and the protection actions include intercepting the file modification operations and creating backup copies of the backup files before permitting the file modification operations to modify the backup files. In some embodiments, the mitigation action includes terminating execution of the computational entity, preventing the computational entity from accessing a communication network, preventing the computational entity from modifying one or more storage resources of the computer system, and/or replacing one or more files modified by the computational entity with respective backup files.

Particular embodiments of the subject matter described in this specification can be implemented so as to realize one or more of the following advantages. In some embodiments, a behavioral security engine leverages event-stream processing to update (e.g., continually update) risk profiles of computational entities based on a stream of computer system activity. When one or more potentially threatening events are detected (e.g., when a cluster of multiple potentially threatening events is detected), the behavioral security engine defends against (e.g., blocks, prevents, or mitigates) an attack by the potential threatware (e.g., malware or ransomware). The threatware can be file-based or fileless.

In some embodiments, a behavioral security engine detects fast-evolving threats (e.g., ransomware threats, malware threats, etc.), including fileless attacks and unknown (e.g., zero-day) attacks, and protects computer systems (e.g., endpoints) from such threats. In some embodiments, a behavioral security engine detects streaming ransomware, defends against streaming ransomware, and/or prevents streaming ransomware attacks. In some embodiments, a behavioral security engine detects and/or prevents ransomware attacks, even if the attack uses an unknown file (e.g., an unknown executable file) or no file at all. In some embodiments, a behavioral security engine is able to detect and/or prevent ransomware attacks even if the security engine is offline (e.g., disconnected from the Internet, from the cloud, from the enterprise network, etc.). In some embodiments, a behavioral security engine detects and/or prevents ransomware attacks with little or no performance impact on the computer systems protected by the security engine. In some embodiments, a behavioral security engine detects and/or prevents ransomware attacks using little or no additional security resources and/or information technology resources beyond those already allocated to cybersecurity applications. In some embodiments, a behavioral security engine protects files and/or boot sectors from encryption by ransomware.

In some embodiments, a behavioral security engine detects ransomware attacks with a low rate of false negative detection events and a low rate of false positive detection events. In some embodiments, the behavioral security engine functions as a complete, non-disruptive prevention solution effective against data loss resulting from techniques used by existing and emerging ransomware attacks, including "zero-day" attacks. In some embodiments, a behavioral security engine provides protection against ransomware-induced data loss on two or more levels, including: (1) file-system level and (2) raw storage device level. At the file-system level, some embodiments of the security engine can protect user data files (e.g., user documents or media files), application data, and system files. The scope of file-system level protection can span across local file systems, external drives, network shares, and backups. At the raw storage device level, some embodiments of the security engine can protect system boot records, partition tables, entire physical devices, and file-system structures.

The details of one or more embodiments of the subject matter described in this specification are set forth in the accompanying drawings and the description below. Other features, aspects, and advantages of the subject matter will become apparent from the description, the drawings, and the claims.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Threat Detection and Response

Figure 1:
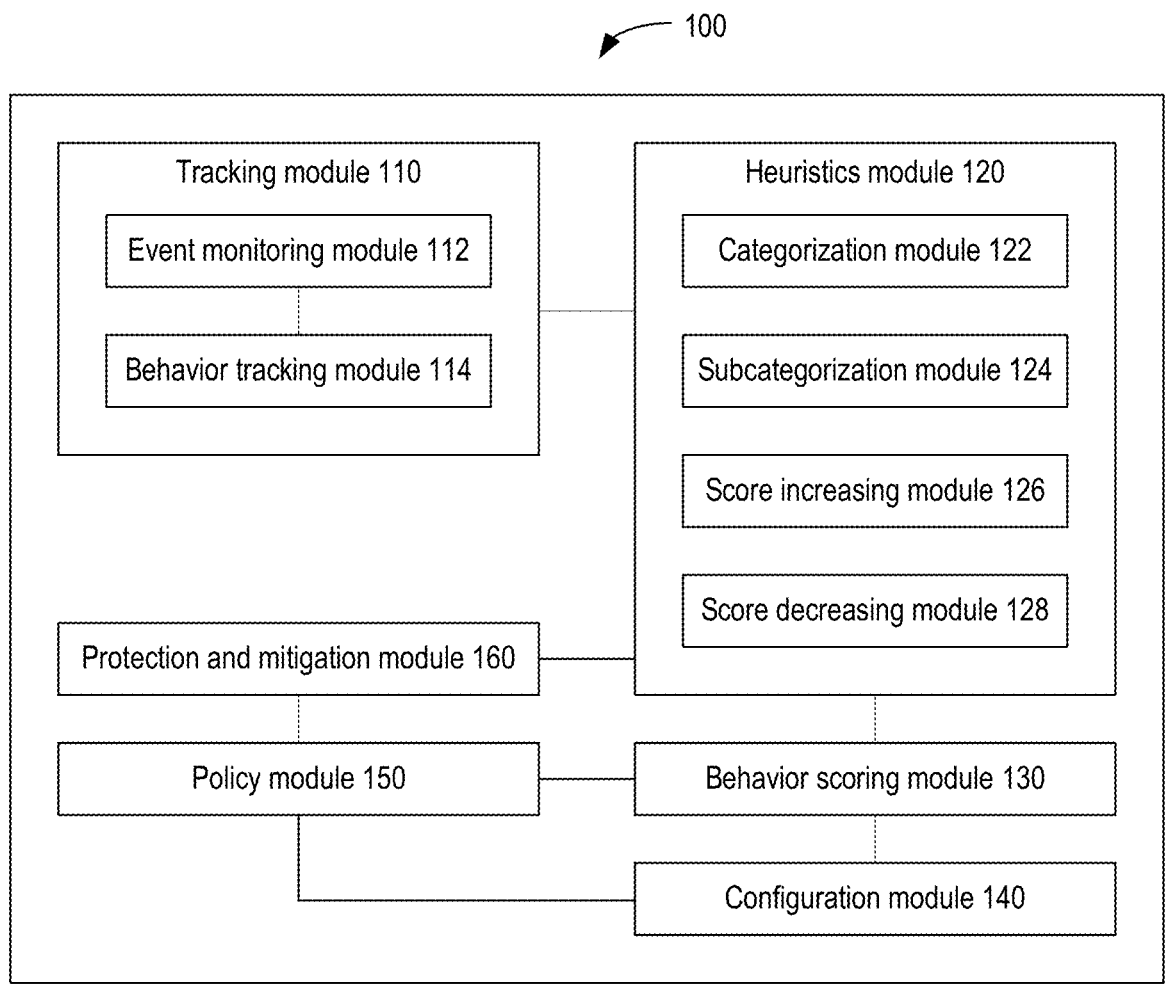
FIG. 1 is a block diagram of a behavioral security engine, according to some embodiments.

Referring to FIG. 1, a behavioral security engine 100 may include a tracking module 110, a heuristics module 120, a behavior scoring module 130, a configuration module 140, a policy module 150, and a protection and mitigation module 160. The tracking module 110 may include an event monitoring module 112 and a behavior tracking module 114. The heuristics module 120 may include a categorization module 122, a subcategorization module 124, a score increasing module 126, and a score decreasing module 128.

The behavioral security engine 100 may be a component of a cybersecurity engine, and its modules may cooperate detect potential threats from threatware, including file-based threats and/or fileless (e.g., streaming) threatware threats, by monitoring and analyzing events (e.g., a stream of events) on a computer system (e.g., an endpoint computer system). The behavioral security engine's components may also cooperate to respond to detected threats. Some embodiments of the components of the behavior security engine 100 are described in further detail below.

In some embodiments, the behavioral security engine 100 may perform the following actions: (1) the event monitoring module 112 may track low-level events in a computer system; (2) the behavior tracking module 114 may map events to states and track them; (3) the categorization module 122 may assign a threat category (e.g., a ransomware category) to a potential threat and update the threat category as more events in the computer system are tracked; (4) the subcategorization module 124 may assign a threat subcategory (e.g., a ransomware category) to a potential threat and update the threat subcategory as more events in the computer system are tracked; (5) the behavior scoring module 130 may assign a threat score to the potential threat adjust the t threat score as more events in the computer system are tracked; and (6) if the threat score exceeds a threshold associated with the threat category (or subcategory) assigned to the potential threat, the policy module 150 and protection and mitigation module 160 may cooperate to perform a threat response action specified by the configuration module 140 for the detected type of threat. The configuration module 140 may be configured (e.g., by an administrator) with a security policy that defines actions to be taken upon detection of particular categories of threats (e.g., particular categories of ransomware threats).

Tracking:

The tracking module 110 may monitor events occurring in the computer system and track the behavior of computational entities in the computer system based on the monitored events. A computational entity may be, for example, a thread, a process, an application, or a related set of two or more threads, processes, and/or applications. The tracking module 110 may include an event monitoring module 112, which may monitor low-level events in the computer system. In some embodiments, the event monitoring module 112 tracks events from one or more layers of the operating system ("OS") of a computer system in real-time, within the context of a computational entity, and analyzes the monitored events. The types of events monitored may include, without limitation: (1) computational unit creation events, (2) script and/or library load events, (3) file input/output ("I/O") events (e.g., directory read/enumerate; file read, write, create, delete, rename/move; etc.), (4) network events (e.g., create incoming and/or outgoing network connections, etc.), and (5) system calls and/or calls made by a process to an application programming interface ("API") of the OS. Some examples of API calls that may be monitored include, without limitation, (1) API calls related to searching a filesystem, gathering system information, disabling backups, or mounting a disk partition; (2) API calls characteristic to code injection (e.g., from a malicious actor into ransomware host process); and (3) API calls querying system information.

The tracking module 110 may also include a behavior tracking module 114, which may receive data relating to monitored events from the event monitoring module 112. The behavior tracking module 114 may track the behavior of computational entities and maintain threat profiles for the computational entities. Each computational entity's threat profile may include data indicating one or more profile states of the computational entity. The behavior tracking module 114 may update a computational entity's threat profile (e.g., update the profile states in the threat profile) based on monitored events associated with the computational entity, thereby mapping the events to corresponding states.

In some embodiments, the behavior tracking module 114 augments data corresponding to tracked events with additional static and/or dynamic information including, without limitation, context details and/or state information associated with the event. The behavior tracking module 114 may map events to internally tracked states that include additional metadata (e.g., counters and/or timestamps). Such states may be tracked on different levels, for example, (1) per computational entity performing the action, for example, a process enumerating directories, reading and writing files; (2) per unique application identifier (e.g., sha256 file hash), to track behavior of an application across processes, and (3) on system level (e.g., system states impacting or responding to application behavior).

In some embodiments, the behavior tracking module 114 extends the notion of behavioral state tracking from individual computational units (e.g., individual processes) to sets of related computational units (e.g., multiple-process chains). The behavior tracking module 114 may determine whether suspicious behaviors of one computational unit are likely performed on behalf of another computational unit (e.g., a main process in control). In addition, the behavior tracking module 114 may determine such likelihood, identify the effective actor and the extent of the set of related computational units, and track behavior across the entire set of related computational units, ultimately enabling the behavioral security engine 100 to enforce policies for all computational units in a set responsible for malicious behavior (e.g., ransomware behavior). In addition, the behavior tracking module 114 may use heuristics (described below) to differentiate potentially malicious behaviors from safe behaviors of computational units that are part of the OS, thereby reducing false positive detection of threatware.

Heuristics:

In some embodiments, the heuristics module 120 implements processes (e.g., heuristic processes) for assigning threatware categories (e.g., ransomware categories) to computational entities, assigning threatware subcategories (e.g., ransomware subcategories) to computational entities, and/or adjusting threat scores of computational entities. From time to time (e.g., periodically or in response to specific events), the heuristics module 120 may query the behavior tracking module 114 to determine the profile states of a computational entity, and may notify the behavior scoring module 130 when a heuristic that affects a computational entity's category, subcategory, and/or score is triggered (e.g., by a change in the state of the computational entity). In some embodiments, the heuristics module 120 may notify the protection and mitigation module 160 when a heuristic associated with initiation a protection or mitigation action (e.g., initiating a backup process) is triggered. The heuristics module 120 may track the values of heuristic states and categories internally.

Categorization and Subcategorization:

The heuristic module's categorization module 122 may implement categorization heuristics suitable for assigning threat categories to computational entities based on their behavior. In some embodiments, the categorization module 122 may assign a computational entity the threat category that matches (e.g., most closely matches) the computational entity's current set of profile states.

In some embodiments, the categorization module 122 uses the categorization heuristics to detect ransomware-specific behaviors, at least one of which is generally characteristic to any type of ransomware. These categorization heuristics may act as first-level filters and triggers. These first-level filters may facilitate the maintenance of a low false-positive ransomware detection rate, and/or may narrow the monitoring scope of the tracking module 110, thereby lowering overall impact on system performance. Suspicious computational entities may be assigned ransomware categories (for example, the following ransomware categories) based on detection of certain behaviors exhibited by the applications:

Category A: Encrypting files on local, remote (network), or external drives;

Category B: Encrypting raw storage device or parts of it (e.g., master boot record (MBR) sector on boot drive, or entire backup drive); and/or Category C: Disabling system backups.

A suspicious computational entity that exhibits behaviors associated with two or ransomware categories may be assigned to all of the corresponding ransomware categories at the same time.

A computational entity may be assigned to ransomware Category A if the entity exhibits behaviors associated with encrypting files, including, without limitation, (1) enumerating a storage device or a directory of a file system, and/or (2) modifying private files.

Storage Device and/or Directory Enumeration:

Heuristics for detecting enumeration of a storage device (e.g., disk) or directory may take advantage of the observation that ransomware generally has a starting point during a search to locate data files. The starting point generally includes, but is not limited to, well-known top-level directories (e.g., the driver letter root, user folder, user's documents and desktop, etc.). In some embodiments, several top level directories on the endpoint device are monitored for enumeration, including the root of each mount point (internal, external drives, network shares, backups), user folders, and several well-known subfolders under the user folders. Additional high-value directories may be monitored (e.g., high-value directories that could be derived by ransomware in some other way than using recursive enumeration, such as by querying the system state for mount points or user names). For example, network share mounts that often use directory structure conventions may be monitored.

In some embodiments, descendant directories deeper in the directory tree are not monitored for the starting point directory enumeration. This technique may help the behavioral security engine 100 maintain a low false positive rate, without increasing false negatives, because real ransomware generally does not possess a knowledge of target machine directory structure, beyond the starting point directories, without performing the initial discovery.

In some embodiments, after a computational entity enumerates a starting point directory, the descendant directories may be recursively monitored for enumeration to establish whether a continuous recursive directory enumeration occurred all the way down to a directory in which a potential file encryption operation is detected. This heuristic can further reduce false positives in cases in which a legitimate application enumerates one of the known starting point directories and independently, often for other reasons, enumerates a directory known to that application, which may be several levels down from the starting point directory, but without enumerating any directories in between.

On some operating systems, false positive mitigation techniques may be used to rule out directory enumeration by a computational unit while the computational unit is loading and enumerating folders to locate dynamic libraries to be linked. For example, a useful false positive mitigation technique in this case may be to discard events initiated by a computational unit prior to initiating the execution of the computational unit's main method.

Modifying Private Files:

Some files are known to be private only to a specific application and are known to be maintained only by that application. Examples may include document files created by an installer of another application. When a computational entity attempts to modify a file that is private to a separate computational entity, that behavior may be indicative of ransomware. (In addition or in the alternative, modification of private files may be used by the subcategorization module 124 to subcategorize suspected malware as "file-encrypting.")

A computational entity may be assigned to ransomware Category B if the entity exhibits behaviors associated with encrypting a raw storage device or a portion thereof, including, without limitation, modifying a raw storage device.

Modifying Raw Device:

Examples of raw device modification operations may include attempting to access a raw storage device and write to specific regions thereof (e.g., master boot record (MBR) sector in case of the boot device, partition table or arbitrary region of non-bootable data drive, etc.), bypassing the OS. In case of a computational entity that includes a set of related computational units, the effective actor may be derived by traversing the process hierarchy. To reduce or avoid potential false positives during an OS upgrade, raw device modification operations initiated by computational units that are well known OS components and are not invoked by an external computational unit may be discarded.

Raw device modification heuristics may extend to detection of modification of low-level file system structures (e.g., inodes). For example, ransomware may traverse and encrypt chosen inode data directly, without going through filesystem virtualization layer, like most user-space applications. Ransomware could also modify file system structure pointers to hide files from user, without actually encrypting the inode data, thereby achieving a similar end-effect.

In some embodiments, the categorization module 122 may assign separate categories to computational entities that attempt to write to specific regions of the raw device (e.g., the MBR or partition table) and computational entities that attempt to modify low-level file system structures. For example, the categorization module 122 may assign Category B1 to the former computational entities, and Category B2 to the latter computational entities.

A computational entity may be assigned to ransomware Category C if the entity exhibits behaviors associated with disabling a computer system's backup capabilities, including, without limitation, deleting/disabling backup files and/or disabling backup/restore functionality.

Disabling System Backups:

Examples of behaviors associated with disabling system backups may include (1) deleting, encrypting, or otherwise modifying backup files, and (2) disabling a computer system's ability to create new backups or restore data and settings from existing backups. In the case of a computational entity that includes a related set of computational units, the effective actor may be determined to derive intent and avoid triggering false positives in legitimate use-cases (e.g., when a user is re-configuring backups).

Since some of these behaviors could be also exhibited by legitimate software, additional heuristic techniques (described below) may be by the categorization module 122 to further increase detection and prevention accuracy and reduce the false positive rate.

When a ransomware category is assigned to a computational entity, the behavior scoring module 130 may use scoring heuristics specific to that category to determine an initial threat score for the computational entity. Suitable scoring heuristics for computational entities assigned to ransomware Categories A, B, B1, B2, and/or C are described in further detail below.

After a ransomware category is assigned to a computational entity, the subcategorization module 124 may use subcategorization heuristics specific to the assigned category to further classify potential ransomware into subcategories. These heuristic methods may factor in complexity and uncertainty characteristics to detection of different malicious techniques. For example, Category A ransomware may be divided into subcategories based on any suitable criteria, including but not limited to: (1) whether the computational entity encrypts files in-place, out-of-place, or both, (2) whether the computational entity has multiple computational units or a single computational unit, and (3) whether the computational entity utilizes built-in system utilities.

When a ransomware subcategory is assigned to a computational entity, the behavior scoring module 130 may use scoring heuristics specific to that subcategory to adjust the threat score for the computational entity. Suitable scoring heuristics for computational entities assigned to the various ransomware subcategories are described in further detail below.

After a ransomware category is assigned to a computational entity, the categorization module 122 may adjust the category assigned to the computational entity dynamically as more behavior is processed and more is known about the entity. Likewise, after a ransomware subcategory is assigned to a computational entity, the subcategorization module 124 may adjust the subcategory assigned to the computational entity dynamically as more behavior is processed and more is known about the entity.

In general, categorization and subcategorization may allow for better control of prevention sensitivity for a given category or subcategory of ransomware, without affecting scoring of other categories or subcategories.

In some embodiments, one or more of the following heuristic techniques may be used by the categorization module 122 for categorization, by the subcategorization module 124 for subcategorization, and/or by the scoring module 130 for initial scoring:

- Tracking of a computational entity's use of low level IO operations and pathways that can lead to net-resulting file modification.
- Tracking of file modifications initiated by a computational entity's use of, in relation to file IO path, file node attributes and content.
- Tracking of a computational entity's modifications of files in directories and subdirectories that the entity previously enumerated during discovery stage.
- Tracking of number of files modified by the computational entity.
- Filtering file modification events based on file type. Modifications of all files may be accounted for and/or prevented, however, modifications of particular file types may carry more weight than others. For example, data files may be assigned more weight.
- Filtering file modifications based on file location. The system may not track modifications of files located in specific directories (e.g., user folders, on network shares or backup devices, etc.) when the modifications are performed by specific computational entities. For example, events associated with known backup software modifying files on backup store may be filtered out.
- Filtering file modifications based on file location and file type. More weight may be assigned to modification of non-data files on non-local drives (e.g., network drives, external drives, etc.). This method may increase detection sensitivity and reduce data-loss when ransomware attempts to encrypt non-data files on non-local drives. Non-local drives can be particularly vulnerable to ransomware because (1) ransomware can generally encrypt such drives entirely without taking away a mechanism to deliver a ransom message to the user, and (2) network shares and backup drives may be of especially high value to the user.
- Tracking of different types of file modifications, by keeping track of counters and ratios of different IO operations (e.g., reads, writes, creates and/or deletes) on files. These counter values and ratios may be updated regularly (e.g., after every IO operation). This data may be used to determine whether (1) a file of interest is being directly modified (in-place encryption), or (2) a copy of the file is being modified, followed by deletion of the original file (out-of-place encryption). This technique may play a role in assigning Category A ransomware to the corresponding subcategory (e.g., the in-place encrypting subcategory or the out-of-place encrypting subcategory). Once the computational entity is subcategorized, the tracking module 110 may track the file encryption behaviors specific to the subcategory more closely, and may assign a more accurate scoring heuristic and more appropriate threat score thresholds specific to the subcategory.
- Tracking of file IO operation patterns indicating legitimate applications, to lower the false positive rate. If a computational entity exhibits specific sequences or patterns of file IO operations (e.g., read, create, write, and/or delete), the heuristics module 120 may determine that the entity is non-threatening, and the tracking module 110 may filters out IO operations of such entities. For example, software installers may modify a small number of pre-existing files, while also generating a larger number of new files. Such a pattern does not fit the behavioral signature of out-of-place encryption and can therefore be rejected to reduce false positives.
- Tracking of file modification and disk enumeration spread across a related set of computational units. This technique may be used for subcategorization and for tracking the behavior of a computational entity that includes multiple computational units. For example, an entity assigned to a ransomware category (e.g., Category A) may be subcategorized further as a single-process entity or a multi-process entity (independently from being subcategorized as an in-place encrypting entity or an out-of-place encrypting entity) for more accurate scoring and independent threshold assignment. In addition, after the entity is categorized as a multi-process entity, the behavior (e.g., heuristic ransomware behavior) of the entity's computational units may be tracked and attributed to the entire entity. The entity's computational units may include known built-in OS tools, in which case invocation of the tool is treated similarly to invocation of an API call. The effective actor among the entity's computational units may be identified by walking the process hierarchy and identifying the process higher in the hierarchy that is not part of the OS and is not a known verified application. In this way, ransomware behavior may be tracked across processes spawned by the actor process or its descendants. For example, a malicious actor may delegate enumeration or encryption tasks to one or multiple sub-processes. When the entity's threat score reaches the assigned threshold, a prevention policy may be applied to the entire entity to ensure that no dangling processes continue executing sub-tasks after terminating only part of the process chain. Due to higher complexity in detection of multi-process ransomware and the intent not being always clear, scoring heuristics and thresholds may be tuned accordingly to maintain a low false positive rate.
- For detection and categorization of Class B ransomware, the categorization module 122 may determine the region of the storage device being modified and correlate that region with the storage device type. For a boot-type storage device, attempts to modify the master boot record (MBR) region may be highly suspicious. For a non-boot-type storage device (e.g., a backup device), modification of any portion of the raw device may be suspicious. These heuristics take advantage of the observation that ransomware that encrypts data at the raw device level generally still needs to be able to execute some piece of code to display the ransomware message with instructions.

Scoring:

The behavior scoring module 130 may maintain a threat score for each computational entity of interest, and the threat score may be persisted across application invocations. The behavior scoring module 130 may receive score adjustment notifications from the heuristics module 120, and may adjust the threat scores for the affected computational entities accordingly. When a computational entity's threat score reaches a corresponding threshold associated with a protection or mitigation policy, the behavior scoring module 130 may signal the protection and mitigation module 160 to apply the corresponding protection or mitigation policy.

As described above, the scoring techniques used by the behavior scoring module 130 for a given computational entity may be specific to the ransomware category and/or subcategory assigned to the entity. For example, the scoring algorithm, scoring units, and/or scoring weights (e.g., multipliers) used by the behavior scoring module 130 to calculate a computational entity's threat score may be specific to the entity's ransomware category and/or subcategory. In some embodiments, the behavior scoring module 130 may also adjust the scoring units and/or scoring weights for a computational entity in response to score adjustment notifications received from the heuristics module 120. As another example, the threshold at which a computational entity's threat score triggers application of a protection or mitigation policy may be specific to the entity's ransomware category and/or subcategory.

In some embodiments, the scoring algorithm (e.g., scoring progression), scoring units, scoring weights, and/or thresholds specific to the different threat classes may be configurable for flexibility and tuning. For example, the rate of increase of a threat score may be configurable to facilitate better tuning of the scoring algorithm and reflect how the various score increasing and score decreasing heuristics can influence the score progression, also accounting for different weights. In some cases, a score increasing or decreasing heuristic may adjust the score by a number of units multiplied by the current multiplier assigned to the entity. In some cases, a score increasing or decreasing heuristic may adjust the heuristic multiplier for that entity, thereby allowing the heuristic to affect the score progression when other scoring heuristics trigger.

In some embodiments, the behavior scoring module 130 may receive a notification from the score increasing module 126 of the heuristics module 120 when one or more of the following score-increasing heuristics triggers (e.g., for a computational entity that has already been assigned a potential ransomware category):

Computational entity modifies multiple files. In some embodiments, the higher the number of files modified by the potential ransomware entity, the greater the increase in the threat score.

Computational entity modifies files of multiple file type classes, which distinguishes the entity from an entity that modifies only files of a single, specific file type class. For example, an unknown computational entity modifying Office documents, text, images, video, and audio files is unlikely to be a file editor. In some embodiments, for every file modified by a potential ransomware entity, the tracking module 110 detects and tracks the original file type and assigns it a file type class (e.g., document, image, video, audio, text, etc.). In some embodiments, the number of file type classes the entity modifies is tracked, and when the number of file type classes modified by the entity reaches a specified threshold, the threat score of the entity is increased.

Detection of file content, name and attribute modification indicating a more definite encryption vs. a non-malicious file content modification, using the following heuristics:
  Comparison of new file names compared to old file names for files with modified content. File name change patterns could indicate clear intent to encrypt as some ransomware uses this technique as a simple way of communicating to the endpoint user which files have been encrypted,
  file magic header after modification different than original magic header,
  file magic header after modification not matching file extension.
  file magic matching original but modification of every file follows a pattern: similar data size modified, or at similar offset, or similar content written to each file.

Rate of file modification: application modifies (in-place or not-in-place) many files within a small time window.

File extension naming patterns for new files created as a result of not-in-place encryption. Once application is sub-categorized as not-in-place encrypting, file extensions of new files created by its process are tracked per every new file created by the process. The method looks for continuity in file extension names generically, rather than only relying on static signatures of extension names commonly used for encrypted files. Typical ransomware is more likely to use either 1) the same arbitrary file extension string for every new encrypted file; often a human readable word used as a hint to the ransomware victim or 2) a different arbitrary file extension string for every new encrypted file, such as a string containing some pseudo-randomness. Potential not-in-place encrypting ransomware that follow either of the 2 these file extension patterns get an additional heuristic score boost, while the ones that break these patterns are not affected by this method.

Persistence—application configures itself as a service or schedules itself as a recurring job.

Tracking application behavior across process instances, i.e. handling ransomware that is re-run. If previous instance of the application exhibited ransomware behavior, the behavior is tracked per hash and then inherited by the newer process instance. This method allows for applying policy sooner on next execution, preventing ransomware from achieving incremental progress as it is being re-executed. On next process execution, new process is either blocked from running, or it is terminated on one of the first file modification attempts. The resulting action depends on accumulation of behavior and confidence during the previous process run. The goal is to prevent ransomware from making incremental progress, while reducing a chance of recurring false positive.

Application attempts a network connection (such as to connect to potential C2). This heuristic is of more value if the application connects to server before modifying data.

Application queries unique system information, such as hardware serial number, UUID, MAC address, IP address, hostname.

Application queries CPU information, such as to detect number of cores and whether the environment is virtualized.

Application invokes randomization API, such as to generate a unique encryption key.

Applications invoked cryptographic API.

Application invokes multiple instances of itself—to achieve parallelization. In addition to increasing the score, the system tracks multiple instances in order to apply policy to all instances of the process, much like in case of generic multi process ransomware chain.

Application vector—applications originating from email applications, web browsers, chat clients, external or network drives.

Date/Time when application was dropped before exhibiting ransomware behavior—applications that appeared on endpoint more recently (threshold is configurable), are treated as more suspect.

Application obfuscates itself by either: running out of unusual folder (not where programs are typically installed), unusual name or extension (such as a document extension), with unusual attributes (such as hidden), by deleting or moving the file the code was loaded from.

Application links to a known encryption library (dynamically or statically)

Detection of IPC and data passed between processes involved in a potential multi-process ransomware chain. This method helps determine intent and whether process is performing a specific task on behalf of ancestor process or on its own. For example, if a sub-process is spawned, which then performs disk enumeration, heuristic looks for data being passed back to the potential process in control to establish clear intent and whether this behavior should be attributed to that process, effectively extending the multi-process chain.

Application reputation: applications that are not yet widely known and appear to be potential 0-day attacks, or applications that are not signed by a trusted and verified authority.

Application has been previously detected as compromised by one of code injection mechanism.

Application known to process in memory data content that is more prone to a vulnerability and in-memory exploit, or application that has already undergone buffer overflow.

Commonly known application exhibiting unusual behavior, outside of established norms, indicating potential compromise, even without earlier detection by the system of the actual compromise vector. This method accounts for new, unknown vulnerabilities in core applications. For example, calculator app communicating on the network.

In some embodiments, the behavior scoring module 130 may receive a notification from the score decreasing module 128 of the heuristics module 120 when one or more of the following score-decreasing heuristics triggers (e.g., for a computational entity that has already been assigned a potential ransomware category):

Verified application that is a known modifier of files of certain sanctioned type (for example, a known photo editor application is modifying image files). Such sanctioned file modifications are bypassed by the system, while still keeping track of modification of other file types to account for a case of application being compromised.

Application modifying files in temporary file area—such file modifications are ignored.

Application modifying its own private folder data files, such as an email application modifying e-mail files in data folder corresponding to the actor process.

In multi-process chain, a method is used to determine if the effective actor in control is part of the operating system. The method uses a combination of file path, verified certificate and file reputation. If the effective process in control is an operating system component, the behavior is not policy-enforced, but it can be optionally tracked and reported. This technique reduces false positives with built-in backup utilities, during OS upgrade and operations driven by GUI controls, such as re-partitioning.

While calculating multi-process chain, system takes into account standard operating system services that play a role of "launchers", i.e. execute a process on behalf of another process (e.g., WMI, launched, etc.). In such case, behavior is conducted across such chain, but policy enforcement excludes those standard services that are long-lived and spawned by the OS, and not by the malicious actor.

In some embodiments, the behavior scoring module 130 uses additional heuristic methods to analyze isolated "interesting" behaviors, and the results of such analysis may be used to increase the score of an entity that has been previously classified as potential ransomware. In turn, behaviors that are characteristic of legitimate applications may decrease the current score or bypass one of other heuristics that would otherwise contribute to a false positive. These methods may be helpful to increase certainty.

In some embodiments, the scoring increment associated with each of the foregoing scoring heuristics is relatively low. In some embodiments, none of the scoring heuristics alone may increase the score decisively enough to reach the assigned threshold and trigger the application of a protection or mitigation policy. However, having more scoring methods in the system may allow for higher thresholds to be set and therefore better separation between a real threat and a false positive without sacrificing threat detection.

Configuration, Policy and Protection/Mitigation:

The configuration module 140 may configure (or permit a user or administrator to configure) various parameters and settings of the behavioral security engine, including but not limited to (1) units and weights of the scoring heuristics, (2) categorization and subcategorization parameters, (3) threshold scores that trigger application of protection or mitigation actions for different ransomware categories and subcategories, and (4) protection and mitigation policies (e.g., the particular policy that is triggered when a computational entity's score reaches a particular threshold).

A protection or mitigation policy may define action(s) to be taken against a malicious entity when the entity's threat score reaches the corresponding threshold. Options for responding to a threat may include, without limitation (1) terminating the malicious entity, (2) isolating (e.g., "sandboxing") the malicious entity (e.g., allowing the entity to run, but without allowing the entity to modify data), or (3) allowing the entity to perform all operations and logging the entity's operations.

The policy module 150 may store policy settings retrieved from the configuration module 140. The policy module 150 may receive a notification from the behavior scoring module 130 when an entity's threat score exceeds and associated threshold. In some embodiments, the policy module 150 determines which protection/mitigation action (e.g., terminate, isolate, or log) to perform based on the policy settings and/or the entity's reputation. In some embodiments, the policy module 150 notifies the protection and mitigation module 160 to perform the selected protection/mitigation action.

The protection and mitigation module 160 may enforce protection and mitigation policies in response to receipt of a corresponding notification from the policy module 150. In some embodiments, the protection and mitigation module 160 has the ability to enforce a policy action by denying completion of a file operation, network operation, and/or process creation operation in-line with the operation being requested. In some embodiments, the protection and mitigation module 160 may communicate with the OS to terminate or isolate a running process.

In some embodiments, the protection and mitigation module 160 may optionally (e.g., using a setting) enable the techniques described below in the Section titled "Data Backup and Recovery" (e.g., after a computational entity has been categorized as potential ransomware). These techniques may serve two main purposes: (1) to reduce any data loss that may occur during the transient state of low threat score, e.g., after low number of files are potentially encrypted and before the policy action is taken, and (2) to allow for additional flexibility in increasing the heuristic thresholds, leading to lower false positives.

As just one example, after a computational entity is categorized as Category A ransomware, the protection and mitigation module may begin backing up all files modified by the entity, in-line with and prior to completion of the entity's attempt to modify the files. If the protection and mitigation module 160 subsequently receives a notification from the policy module to restore the files modified by the entity (e.g., in response to the behavior scoring module 130 indicating that the entity's threat score has exceeded the corresponding threshold), the module 160 may then restore the backed-up files.

Data Backup and Recovery

The techniques described in this Section may be used to enhance a behavioral security engine 100 for endpoint devices (e.g., desktops, laptops, terminals, servers, embedded systems) against data loss (e.g., via ransomware) or attempts to make the underlying operating system inoperative (e.g., via destructive malware). The techniques described in this Section may enhance such systems in one or both of the following ways:

1. Protection against file data loss: Behavioral detection systems are generally characterized by a lag between the initial malicious behavior taking place (e.g., data file encryption or destruction) by a suspect application and the time when policy action is taken (e.g., the malicious application is terminated). During this time window, the system can be prone to allow for some data loss, before action is taken to terminate or restrict the potentially malicious application. For example, to maintain low false positives, a conventional behavioral detection system may choose to gather more evidence and gain sufficient confidence. By contrast, the techniques described in this Section may protect the file data integrity during the period of lower confidence.

2. Reduction of false positives: Since the technique protects against data loss during the period of low confidence, the technique may allow for additional flexibility in tuning sensitivity until the state of higher confidence is reached, consequently reducing (e.g., minimizing) the false positive rate. When policy action is taken, data files at risk that were modified or deleted during the period of low confidence can be completely restored.

A data backup and recovery module may be incorporated into the behavioral security engine 100 as follows:

The data backup and recovery module receives notifications about file and directory I/O operations (e.g., create, delete, move/rename, read, write). The notifications may be received in-line with the operations taking place.

The data backup and recovery module receives notifications from the behavioral security engine 100 on interesting state changes of monitored applications.

The security engine 100 may notify the data backup and recovery module (which may be embedded within or external to the security engine 100) when to start performing backups of files affected by a potentially malicious application. For example, the security engine 100 can send the notification early, when a sample has been pre-categorized as potentially malicious, but before any data loss occurred. From that point onwards, the data backup and recovery module may monitor file operations performed by the application/process (or process chain). The data backup and recovery module may be capable of stalling the original file I/O operation (operation requested by the monitored application), for example write or delete, creating a copy of each file that the monitored application is preparing to modify or delete, and storing the copies in a backup area. The file backup operation can be implemented either directly in the file-filter driver or in a user-space agent, as long as the original operation is stalled until the file backup is complete.

The backup area may be protected by file-filter driver, as such, applications that are not part of the security engine are not allowed to modify it. When the prevention system reaches threshold and applies policy at higher certainty point, the files are available for restoration. The restore functionality can be triggered automatically by the prevention system, or by user action.

The techniques described herein may be applicable to Windows, macOS, Linux, and/or other software platforms. There may be differences in implementation details across platforms (e.g., because some data point inputs associated with specific detection methods may not be available on every platform, and/or because low-level operating system features or services available to ransomware differ slightly across different platforms). For example, some of the techniques described herein may differ in implementation and/or score weighting on each platform.

Some Embodiments of Ransomware Detection Methods

Figure 2:
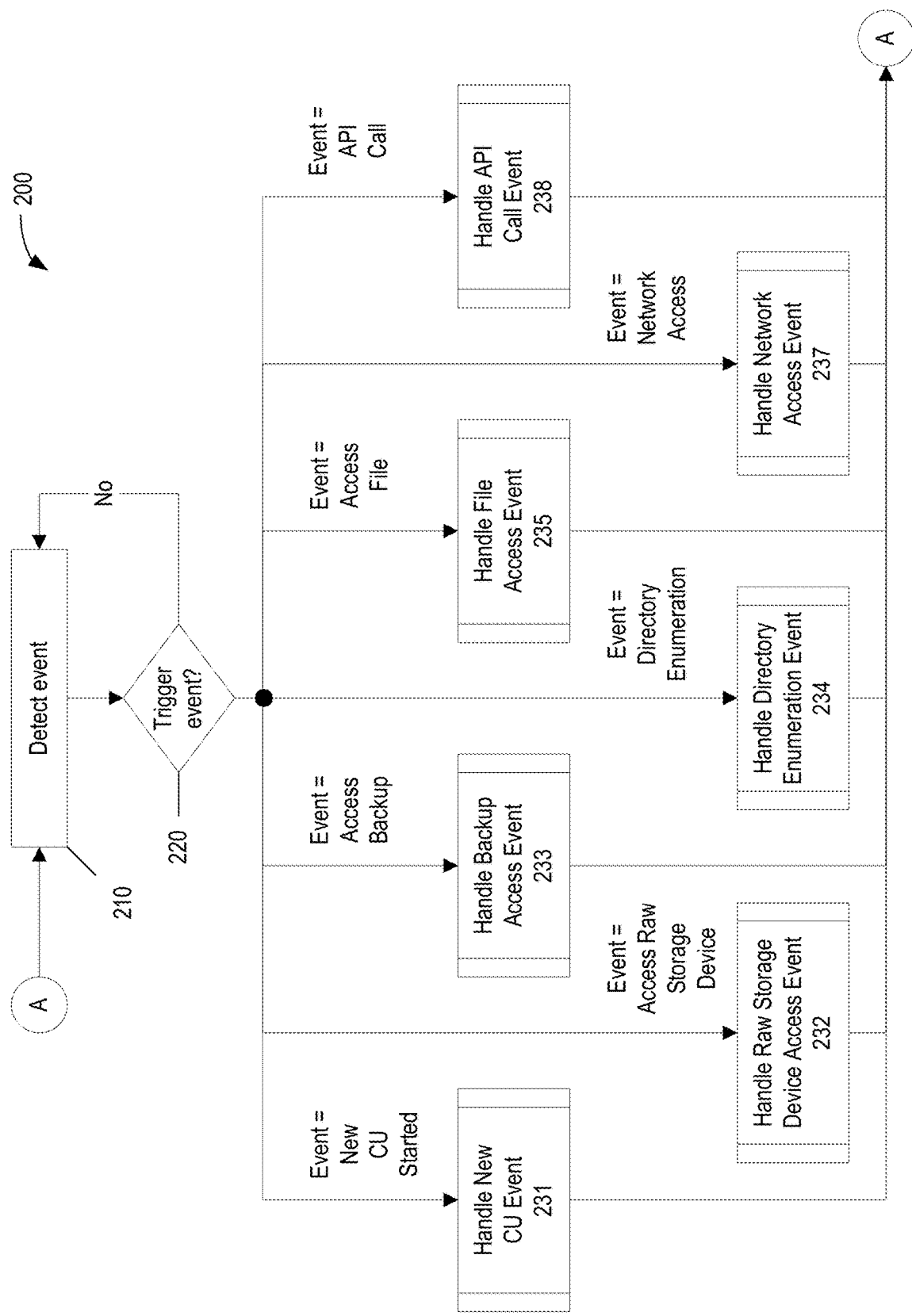
FIG. 2 is a flowchart of a ransomware detection method, according to some embodiments.

Referring to FIG. 2, a ransomware detection method 200 may include steps of detecting 210 an event, determining 220 whether the detected event is a trigger event, and if so, handling the event in accordance with its type. For example, if the trigger event is the creation of a new computational unit, the event may be handled by performing a process 231 for handling creation of a new computational unit. If the trigger event is a computational entity accessing a raw storage device, the event may be handled by performing a process 232 for handling an access of a raw storage device. If the trigger event is a computational entity accessing a backup file, the event may be handled by performing a process 233 for handling an access of a backup file. If the trigger event is a computational entity enumerating a directory, the event may be handled by performing a process 234 for handling directory enumeration. If the trigger event is a computational entity accessing a file, the event may be handled by performing a process 235 for handling an access of a file. If the trigger event is a computational entity accessing a network, the event may be handled by performing a process 237 for handling an access of a network. If the trigger event is a computational entity performing an API call, the event may be handled by performing a process 238 for handling an API call.

The foregoing examples of trigger events and corresponding handler processes is non-limiting; other trigger events may be detected and handled.

If the detected event is not a trigger event, the event detection step 210 may be repeated. Likewise, after a trigger is handled, the event detection step 210 may be repeated. Some techniques for detecting events (e.g., process creation and termination events; file read/write/create/delete/move/mmap events; network activity events; API and system call events, etc.) are described above.

Non-limiting embodiments of the handler processes 231-235, 237, and 238 are illustrated in FIGS. 3A-3G, respectively.

Figure 3A:
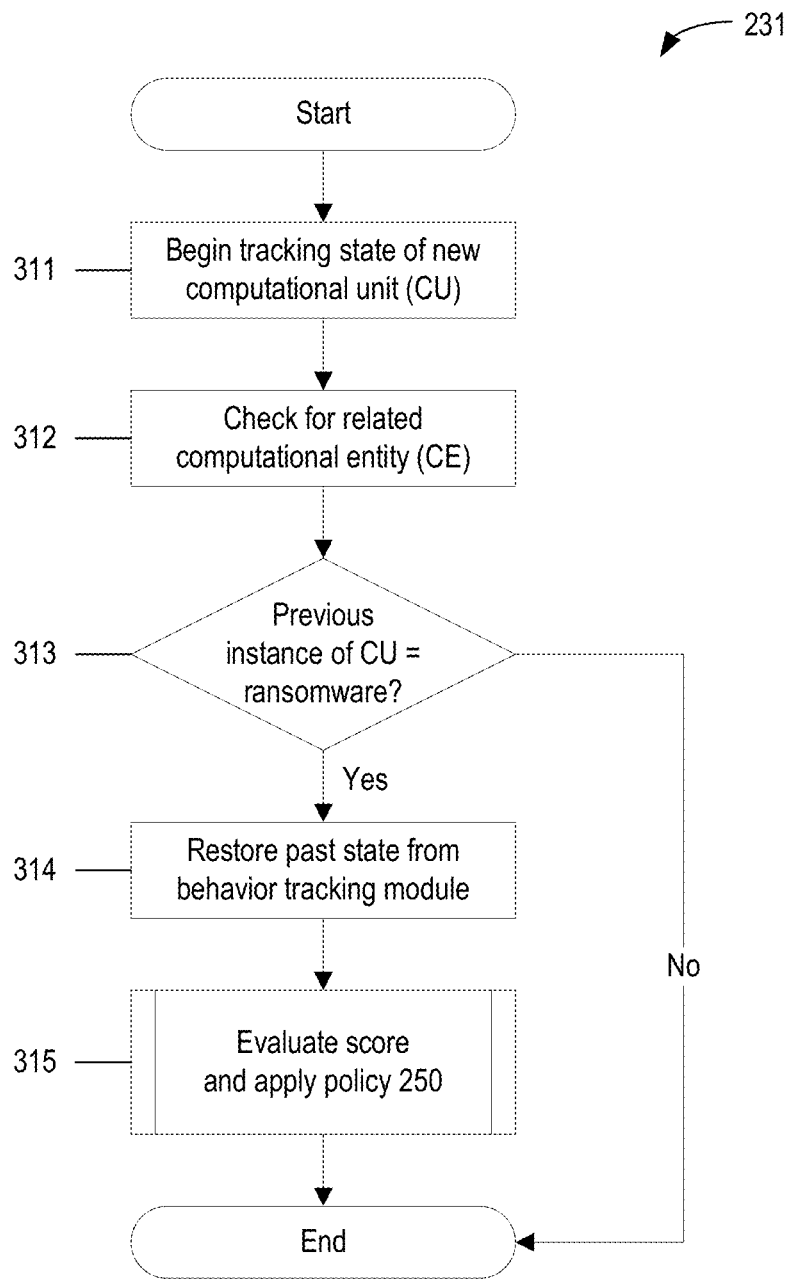
FIG. 3A is a flowchart of a method for handling an event associated with creating a new computational unit, according to some embodiments.

Referring to FIG. 3A, a process 231 for handling an event associated with creating a new computational unit may include steps 311-315. In step 311, the tracking module 110 begins tracking the profile state of a new computation unit (CU). In some embodiments, the profile state of the new CU is initialized such that all elements of the profile state (e.g., file IO counters, network state, system call state, threat score, score weights, CU category, CU subcategory, etc.) are initialized to default values. In some embodiments, the tracking module 110 obtains reputation information indicating a reputation of an application A1 that created the new CU, and stores that reputation information in the CU's state profile. Some examples of suitable techniques for tracking the profile state of a CU during the CU's execution are described above.

In step 312, the tracking module 110 determines whether the new CU is a single-CU computational entity or part of a multi-CU computational entity. If the new CU is part of a multiple-CU computational entity, the new CU is added to the computational entity's state profile, thereby linking the new CU to the computational entity. Some examples of suitable techniques for determining whether a CU is part of a related set of CUs forming a computational entity are described above.

In step 313, the tracking module 110 determines whether a previous instance of a CU corresponding to the application A1 was categorized as ransomware. If not, the process 231 terminates. If so, the tracking module 110 restores (314) the state of the previous instance of the CU in the state profile of the new CU and the behavioral security engine 100 performs (315) a process 250 for evaluating the CU's threat score and applying a corresponding policy, if any.

Figure 3B:
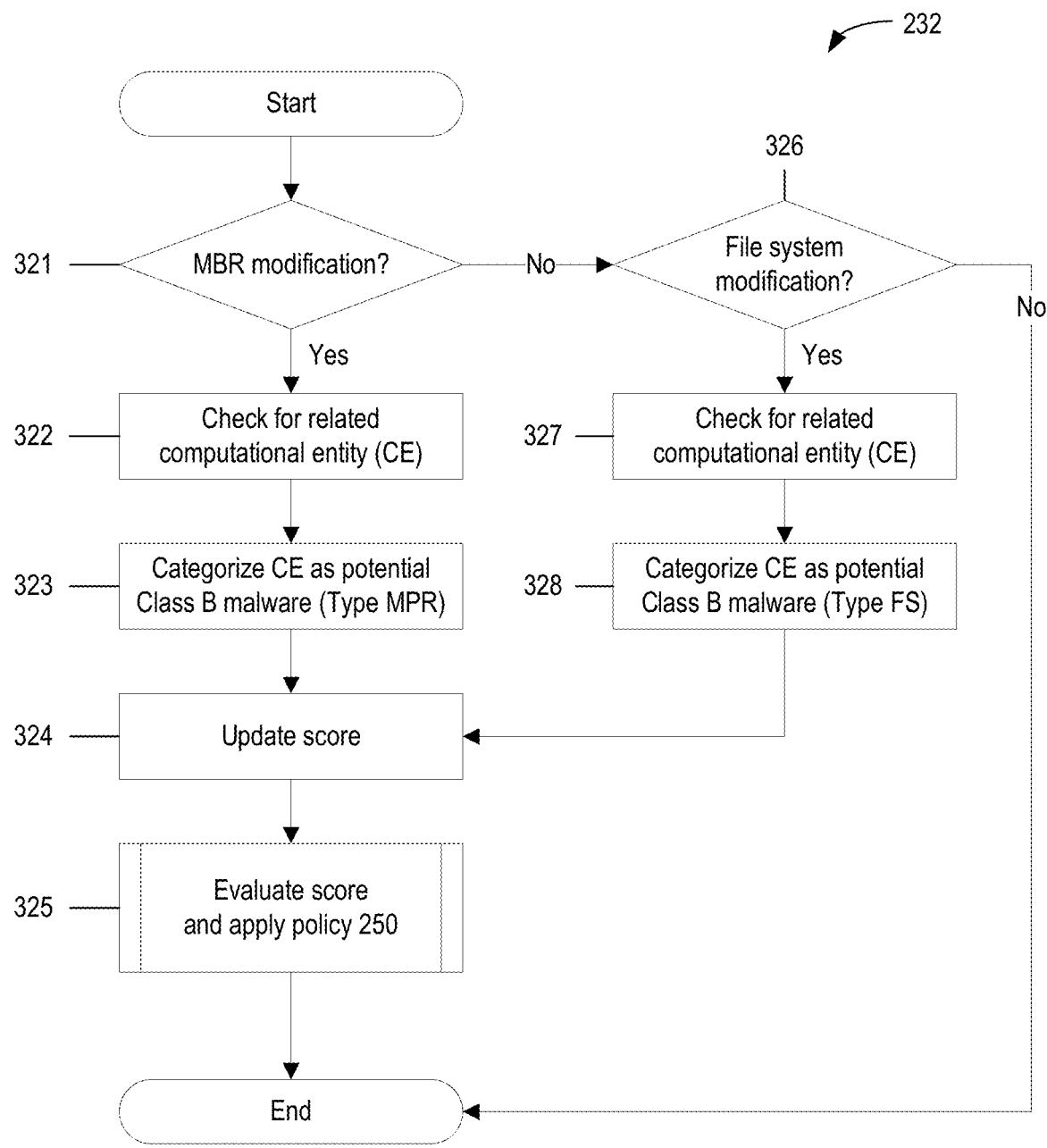
FIG. 3B is a flowchart of a method for handling an event associated with accessing a raw storage device, according to some embodiments.

Referring to FIG. 3B, a process 232 for handling an event associated with accessing a raw storage device may include steps 321-328. At step 321, the tracking module 110 determines whether the event indicates that a computational entity (CE) is attempting to modify a master boot record (MBR) of a boot-type storage device.

At step 321, if the event indicates that the CE is attempting to modify the MBR, the process 232 proceeds from step 321 to step 322. At step 322, the tracking module 110 determines whether the CE is part of a larger computational entity, and if so, links the computational entities. At step 323, the categorization module 122 assigns potential ransomware Category B (or B1) to the CE. At step 324, the behavioral security engine 100 updates the CE's threat score. At step 325, the behavioral security engine 100 performs a process 250 for evaluating the CE's threat score and applying a corresponding policy, if any. Process 232 then ends.

At step 321, if the event does not indicate that the CE is attempting to modify the MBR, the process 232 proceeds from step 321 to step 326. At step 326, if the event indicates that the CE is attempting to modify the file system of a storage device, the process 232 proceeds to step 327. At step 327, the tracking module 110 determines whether the CE is part of a larger computational entity, and if so, links the computational entities. At step 328, the categorization module 122 assigns potential ransomware Category B (or B2) to the CE. At step 324, the behavioral security engine 100 updates the CE's threat score. At step 325, the behavioral security engine 100 performs a process 250 for evaluating the CE's threat score and applying a corresponding policy, if any. Process 232 then ends.

At step 326, if the event does not indicate that the CE is attempting to modify the file system of a storage device, the process 232 ends.

Figure 3C:
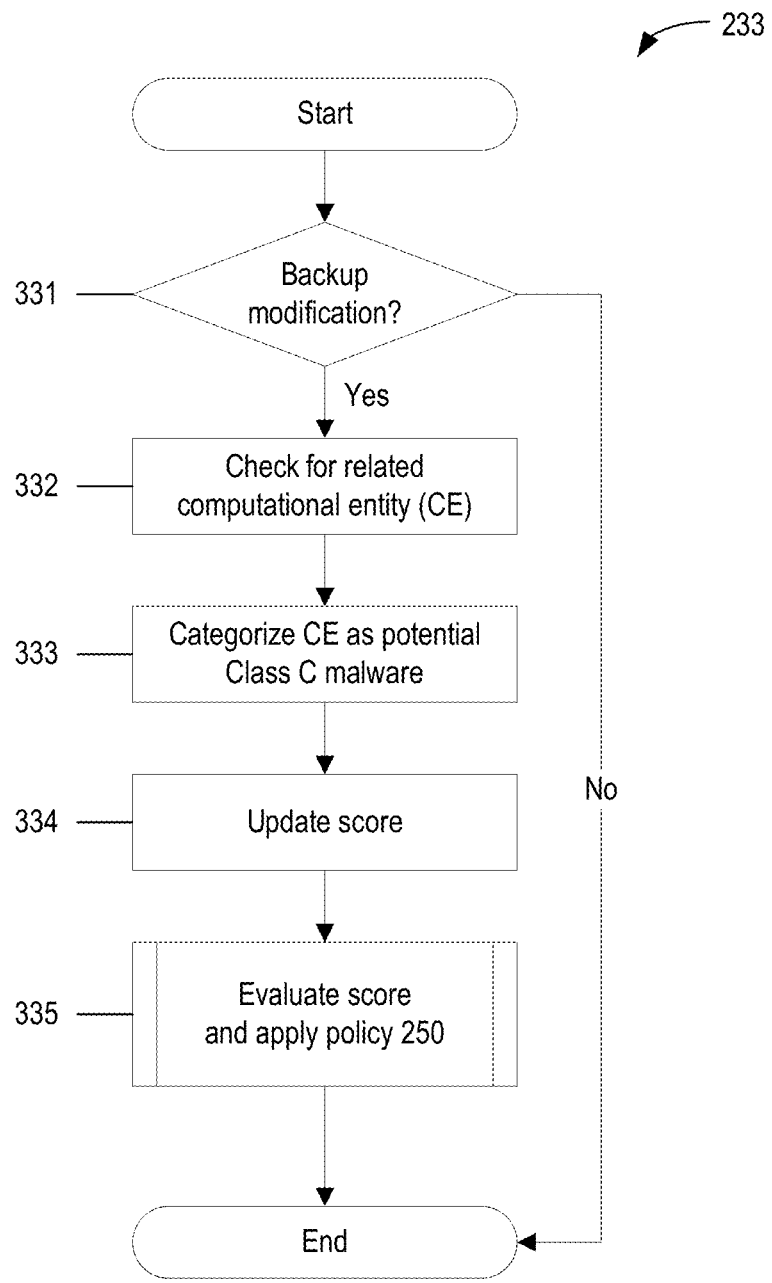
FIG. 3C is a flowchart of a method for handling an event associated with accessing a backup file, according to some embodiments.

Referring to FIG. 3C, a process 233 for handling an event associated with accessing a backup file may include steps 331-335. At step 331, if the event indicates that the CE is attempting to modify the backup capabilities of the computer system (e.g., by disabling the backup functionality, deleting a backup file, modifying a backup file, etc.), the process 233 proceeds from step 331 to step 332. At step 332, the tracking module 110 determines whether the CE is part of a larger computational entity, and if so, links the computational entities. At step 333, the categorization module 122 assigns potential ransomware Category C to the CE. At step 334, the behavioral security engine 100 updates the CE's threat score. At step 335, the behavioral security engine 100 performs a process 250 for evaluating the CE's threat score and applying a corresponding policy, if any. Process 233 then ends.

At step 331, if the event does not indicate that the CE is attempting to modify the backup capabilities of the computer, the process 233 ends.

Figure 3D:
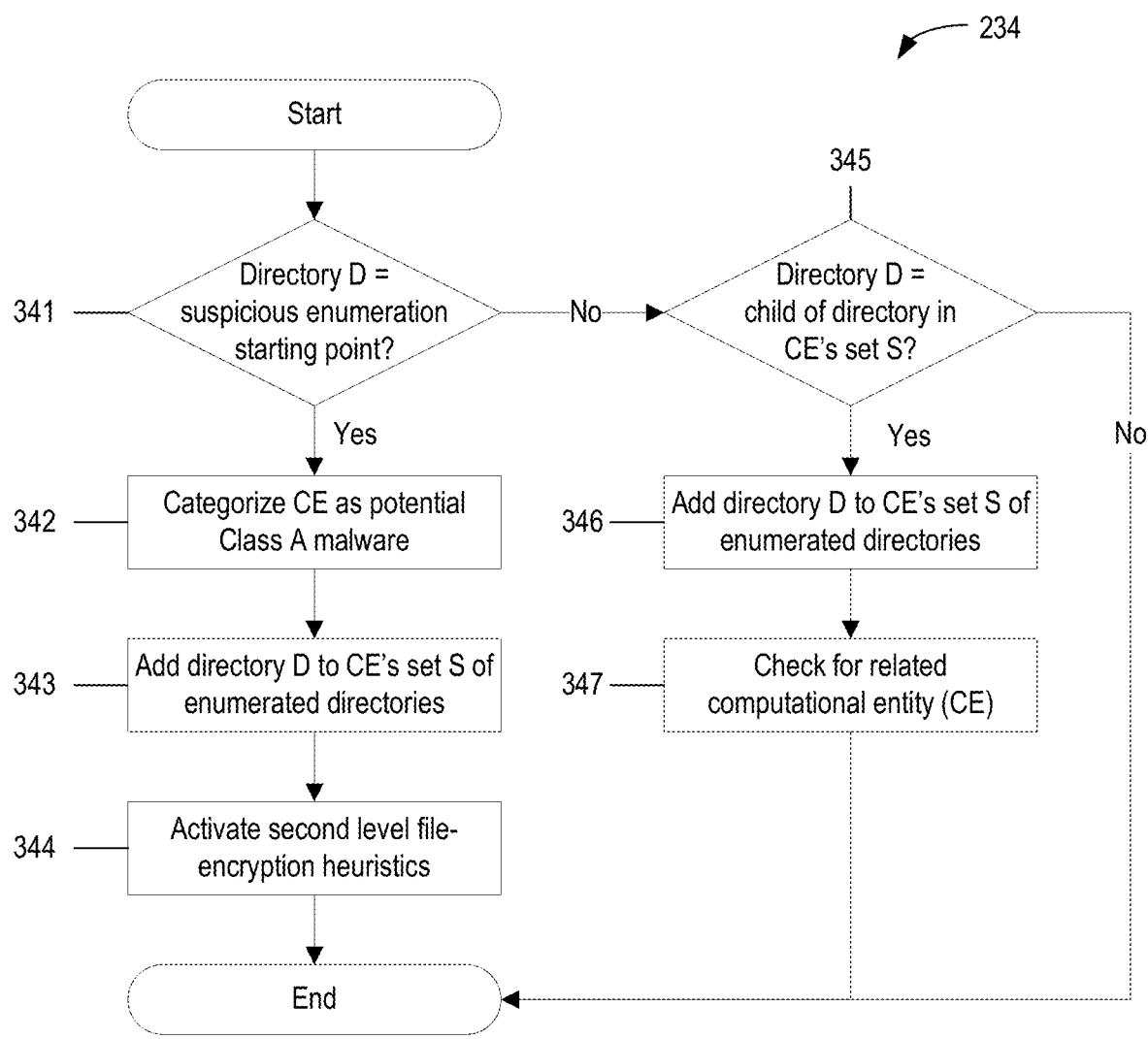
FIG. 3D is a flowchart of a method for handling an event associated with enumerating a directory, according to some embodiments.

Referring to FIG. 3D, a process 234 for handling an event associated with enumerating a directory may include steps 341-347. At step 341, if the directory being enumerated by the CE is one of a specified set of suspicious enumeration starting points, the process 234 proceeds from step 341 to step 342. At step 342, the categorization module 122 assigns potential ransomware Category A to the CE. At step 343, the behavioral security engine 100 adds the directory to a set of enumerated directories in the CE's profile state. At step 344, the behavioral security engine 100 activates the scoring and subcategorization heuristics associated with Category A ransomware for the CE. Process 234 then ends.

At step 341, if the directory being enumerated by the CE is not one of the specified set of suspicious enumeration starting points, the process 234 proceeds from step 341 to step 345. At step 345, if the directory being enumerated by the CE is a child (e.g., a direct child) of a directory that is already in the set of enumerated directories in the CE's profile state, the process 234 proceeds from step 345 to step 346. At step 346, the behavioral security engine 100 adds the directory to the set of enumerated directories in the CE's profile state. At step 347, the tracking module 110 determines whether the CE is part of a larger computational entity, and if so, links the computational entities. Process 234 then ends.

At step 345, if the directory being enumerated by the CE is not a child (e.g., a direct child) of a directory that is already in the set of enumerated directories in the CE's profile state, the process 234 ends.

Figure 3E:
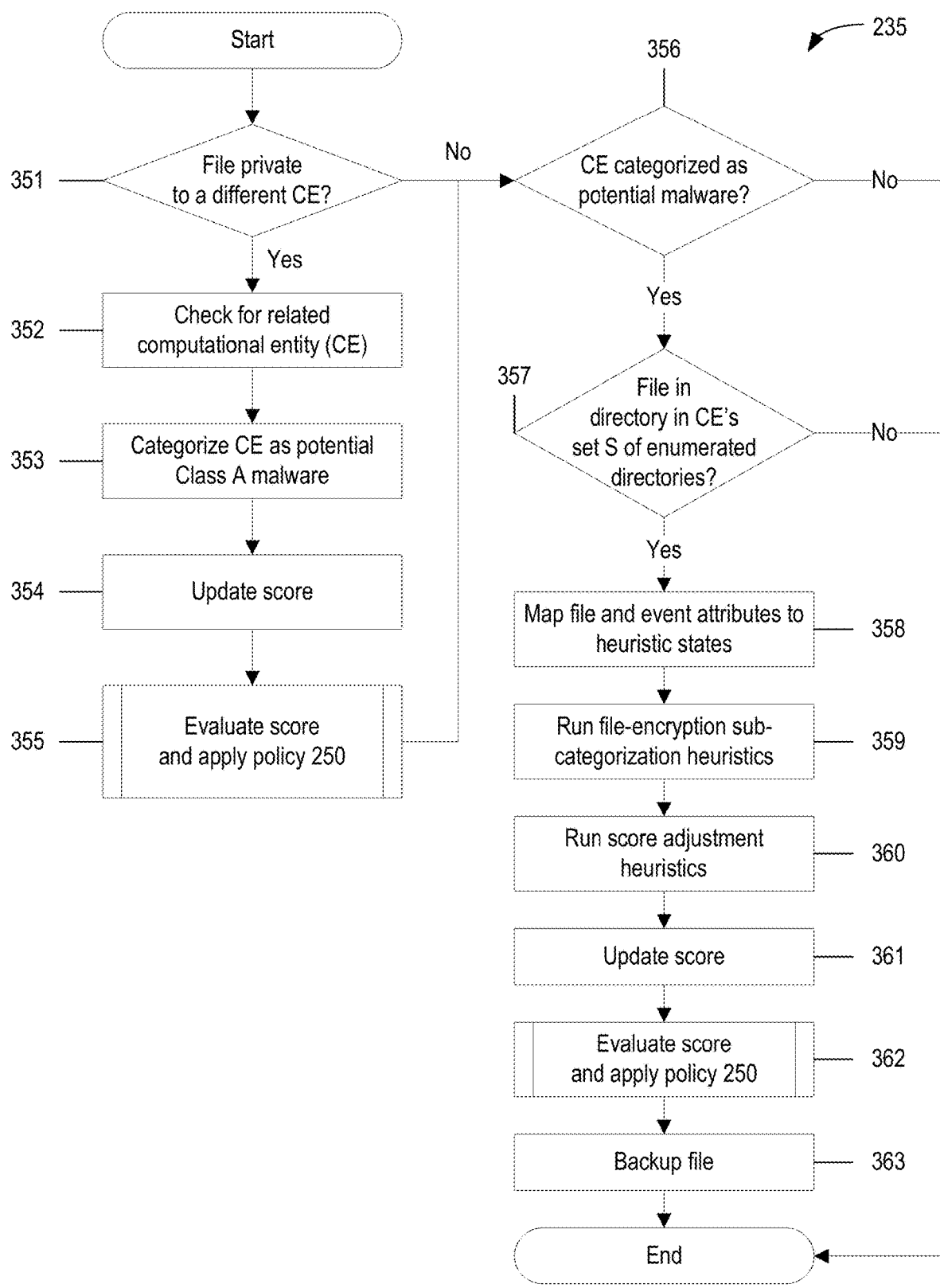
FIG. 3E is a flowchart of a method for handling an event associated with accessing a file, according to some embodiments.

Referring to FIG. 3E, a process 235 for handling an event associated with accessing a file may include steps 351-363. At step 351, if the event indicates that the CE is attempting to modify a file that is private to a different computational entity, the process 235 proceeds from step 351 to step 352. At step 352, the tracking module 110 determines whether the CE is part of a larger computational entity, and if so, links the computational entities. At step 353, the categorization module 122 assigns potential ransomware Category A to the CE. At step 354, the behavioral security engine 100 updates the CE's threat score. At step 355, the behavioral security engine 100 performs a process 250 for evaluating the CE's threat score and applying a corresponding policy, if any. Process 235 then proceeds to step 356. Likewise, at step 351, if the event indicates that the CE is attempting to modify a file that is not private to a different computational entity, the process 235 proceeds from step 351 to step 356.

At step 356, if the CE has already been assigned a potential malware category, the process 235 proceeds from step 356 to step 357. At step 357, if the file is in a directory in the CE's set of enumerated directories (as indicated in the CE's profile state), the process 235 proceeds from step 357 to step 358. On the other hand, if the CE has not been categorized as potential ransomware category or the file is not in one of the CE's enumerated directories, process 235 ends.

At step 358, the tracking module 110 maps attributes of the file and the event (e.g., file type, etc.) to heuristic states. At step 359, the behavioral security engine 100 runs the subcategorization heuristics associated with the CE's ransomware category (e.g., Category A). At step 360, the behavioral security engine 100 runs the score adjustment heuristics. At step 361, the behavioral security engine 100 updates the CE's threat score. At step 362, the behavioral security engine 100 performs a process 250 for evaluating the CE's threat score and applying a corresponding policy, if any. At step 363, the protection and mitigation module 160 backs up the file. Process 235 then ends.

Figure 3F:
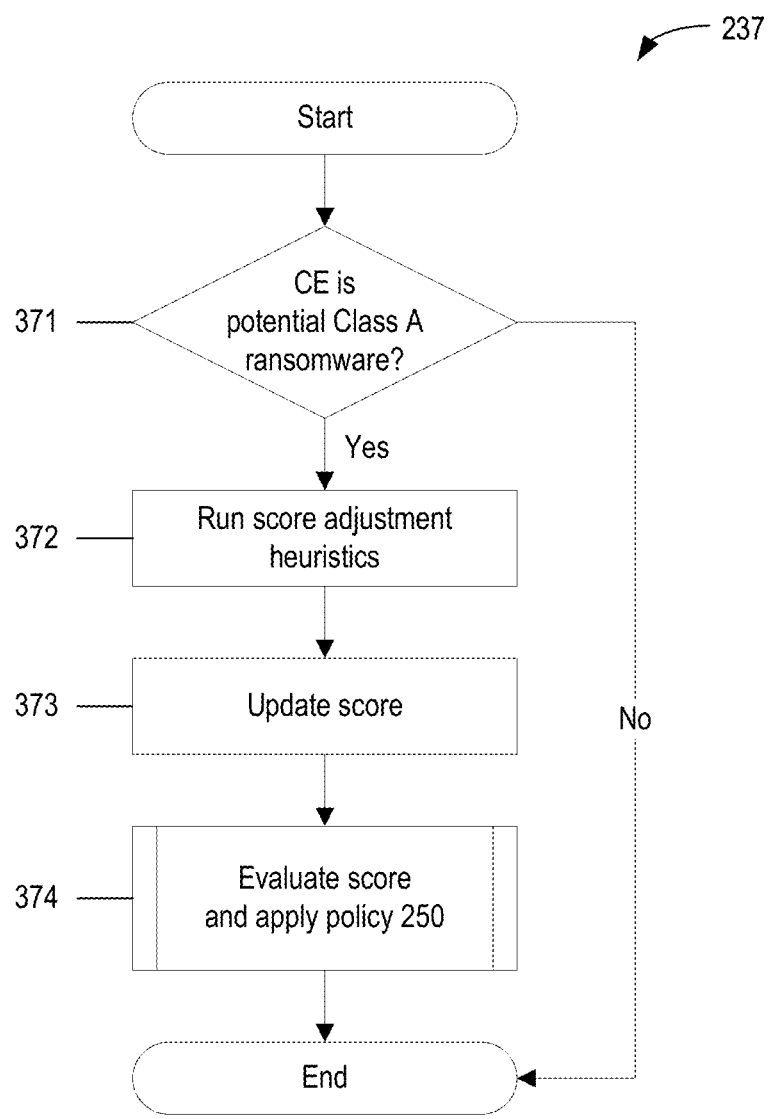
FIG. 3F is a flowchart of a method for handling an event associated with accessing a network, according to some embodiments.

Referring to FIG. 3F, a process 237 for handling an event associated with accessing a network may include steps 371-374. At step 371, if the CE attempting to access the network has been categorized as potential Class A ransomware, the process 237 proceeds from step 371 to step 372. At step 372, the behavioral security engine 100 runs the score adjustment heuristics. At step 373, the behavioral security engine 100 updates the CE's threat score. At step 374, the behavioral security engine 100 performs a process 250 for evaluating the CE's threat score and applying a corresponding policy, if any. Process 237 then ends.

At step 371, if the CE attempting to access the network has not been categorized as potential Class A ransomware, the process 237 ends.

Figure 3G:
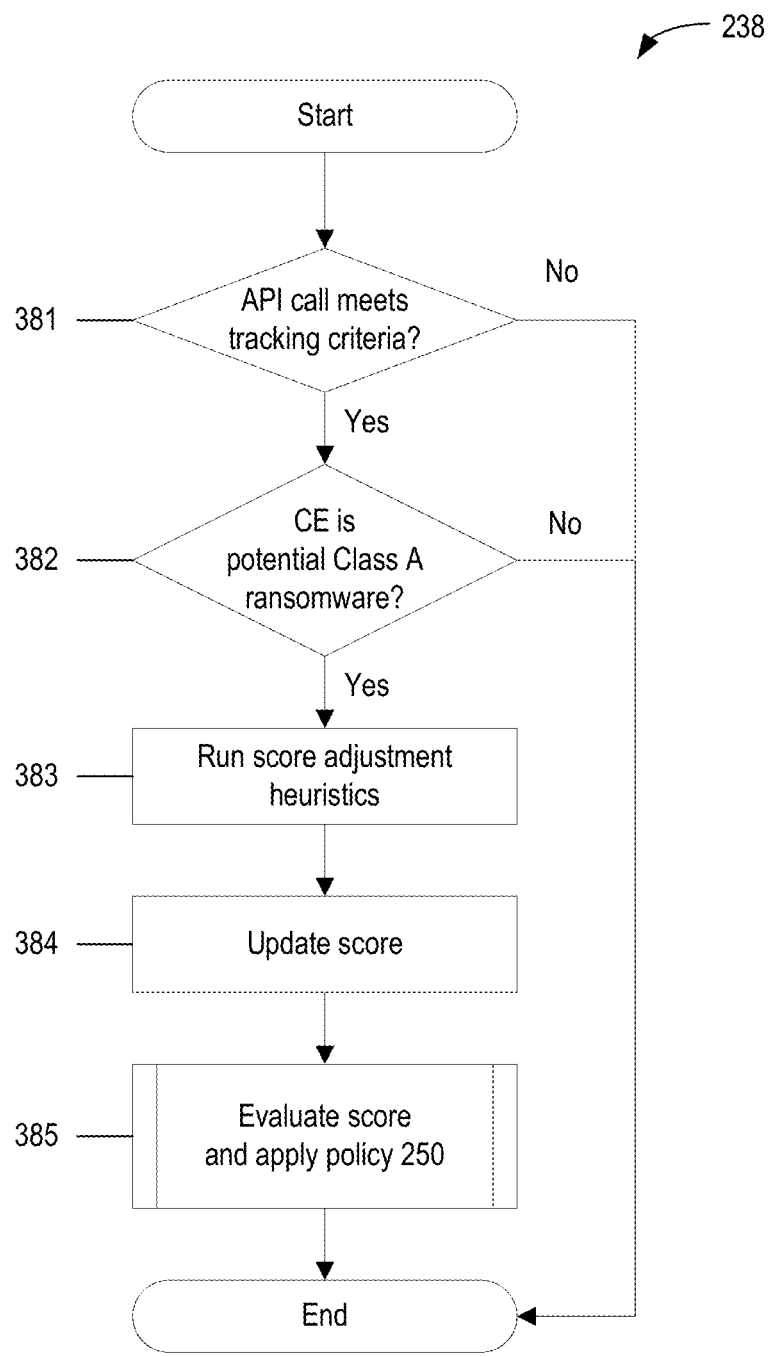
FIG. 3G is a flowchart of a method for handling an event associated with performing an application programming interface (API) call, according to some embodiments.

Referring to FIG. 3G, a process 238 for handling an event associated with performing an application programming interface (API) call (or system call) may include steps 381-385. At step 381, if the API call (or system call) is one of a specified set of API calls (or system calls) associated with ransomware, the process 238 proceeds from step 381 to step 382. At step 382, if the CE attempting to access the network has been categorized as potential Class A ransomware, the process 238 proceeds from step 382 to step 383. On the other hand, if the API call (or system call) is not one of the specified set of calls or the CE has not been categorized as potential Class A ransomware, process 238 ends.

At step 383, the behavioral security engine 100 runs the score adjustment heuristics. At step 384, the behavioral security engine 100 updates the CE's threat score. At step 385, the behavioral security engine 100 performs a process 250 for evaluating the CE's threat score and applying a corresponding policy, if any. Process 238 then ends.

Figure 3H:
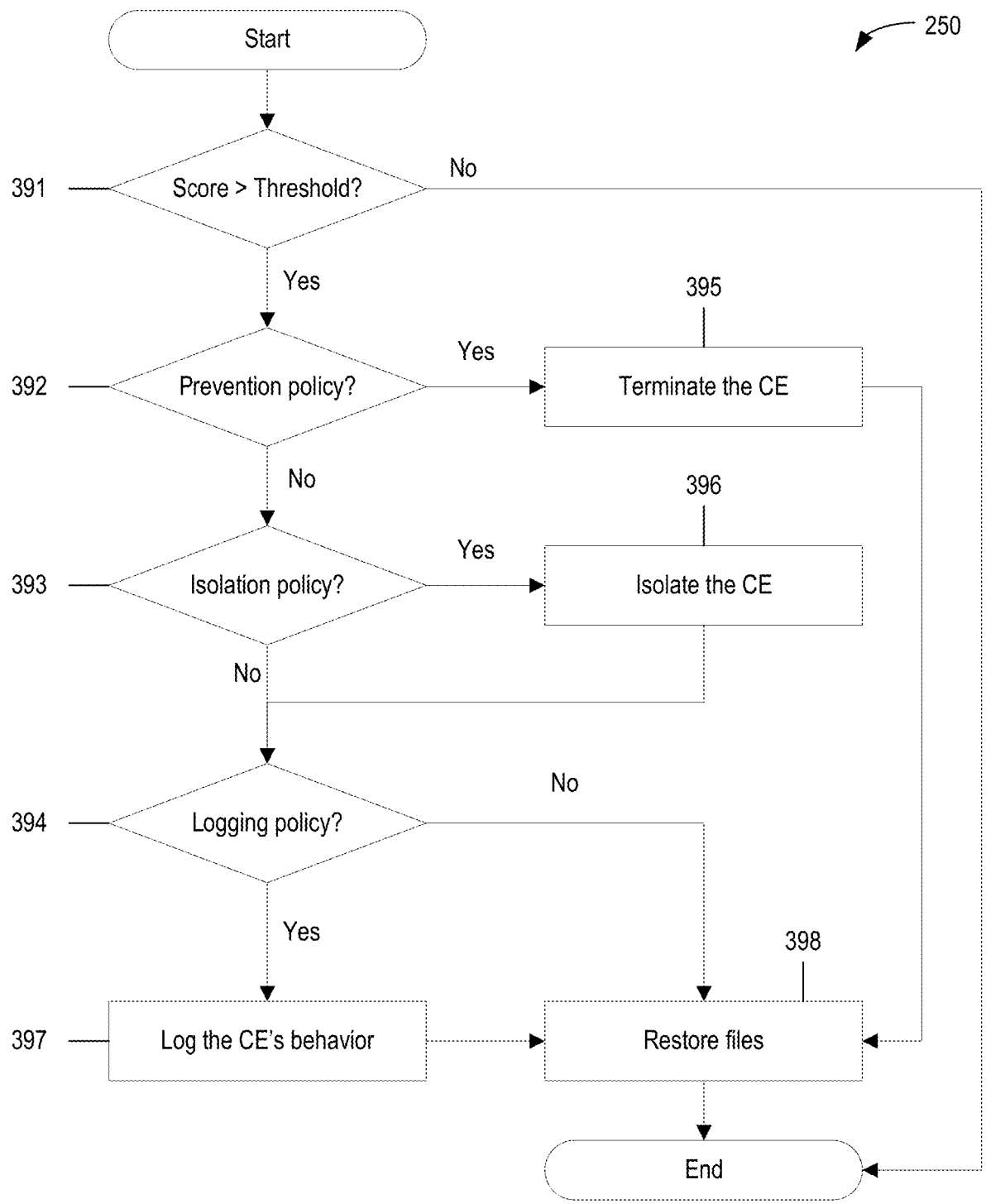
FIG. 3H is a flowchart of a method for evaluating the threat score of a computational entity and applying a security policy to the computational entity, according to some embodiments.

Referring to FIG. 3H, a process 250 for evaluating the threat score of a computational entity and applying a security policy to the entity may include steps 391-398. At step 391, the behavioral security engine 100 determines whether the CE's threat score exceeds a corresponding threshold. If not, the process 250 ends.

If the CE's threat score exceeds the threshold, the process 250 proceeds to step 392. At step 392, if a prevention policy is enabled, the behavioral security engine 100 terminates the CE (step 395) and restores the files modified by the CE (step 398). If the prevention policy is not enabled, the process 250 proceeds to step 393. At step 393, if an isolation policy is enabled, the behavioral security engine isolates the CE (step 396). At step 394, if a logging policy is enabled, the behavioral security engine initiates logging of the CE's behavior. At step 398, the behavioral security engine restores the files modified by the CE.

Figure 4:
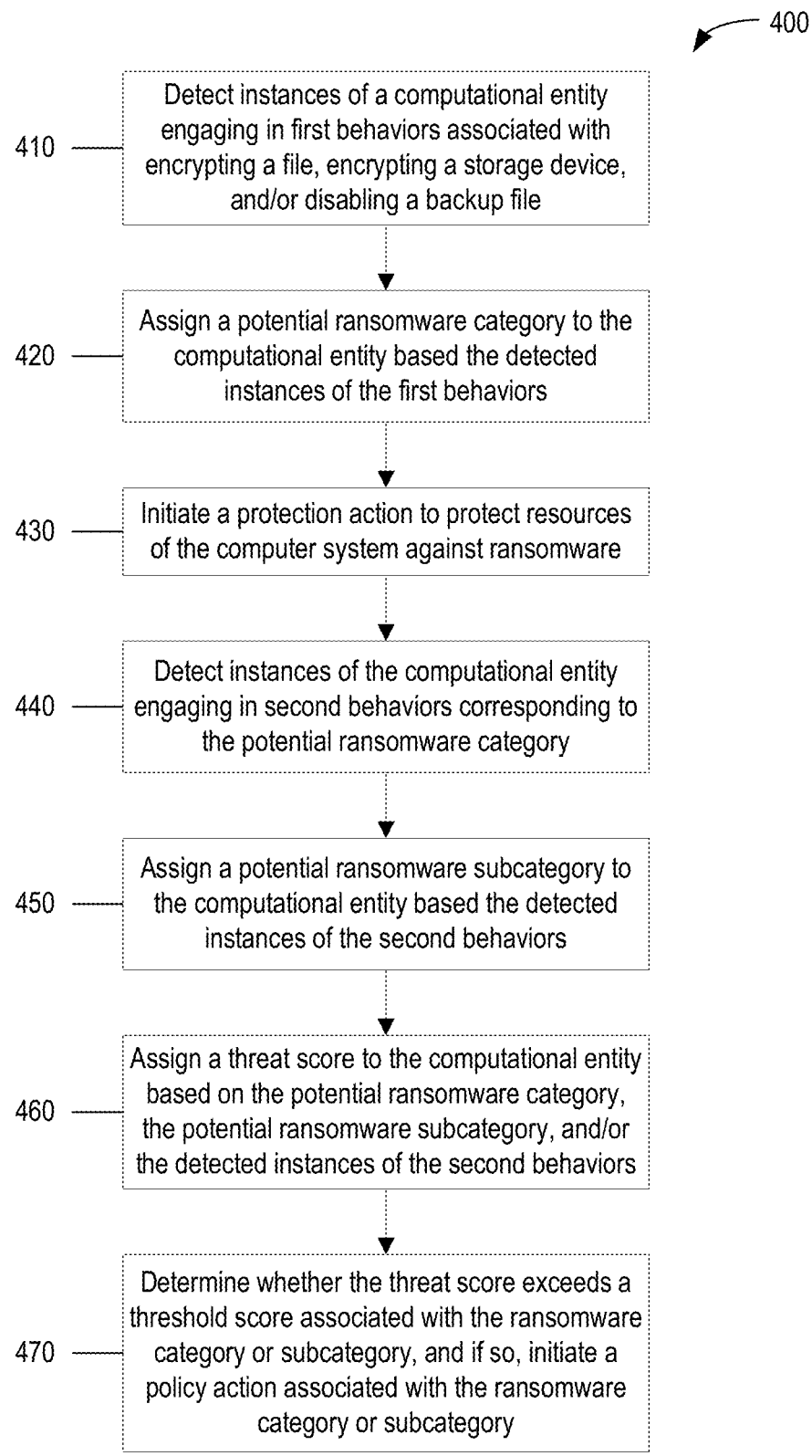
FIG. 4 is a flowchart of another ransomware detection method, according to some embodiments.

Referring to FIG. 4, a ransomware detection method 400 may include steps 410-470. The steps of the ransomware detection method 400 may be performed, for example, by the behavioral security engine 110, using the techniques described above.

At step 410, one or more instances of a computational entity (CE) engaging in one or more first behaviors associated with encrypting a file, encrypting a storage device, and/or disabling a backup of at least a portion of a computer system are detected (e.g., by the tracking module 110). The detected instances of the first behaviors may be detected based on first events initiated by the CE in the computer system. Such events may be detected, for example, by the event monitoring module 114.

At step 420, a potential ransomware category is assigned to the CE based, at least in part, on the detected instances of the first behaviors. The ransomware category may be assigned to the CE, for example, by the categorization module 122.

At step 430, after the potential ransomware category is assigned to the CE, a protection action may be initiated to protect resources of the computer system against ransomware attacks. The protection action may be initiated, for example, by the behavior scoring module 130, the policy module 150, and/or the protection and mitigation module 160. The protection action may, for example, protect storage resources of the computer system against modification operations.

At step 440, after the potential ransomware category is assigned to the CE, one or more instances of the CE engaging in one or more second behaviors corresponding to the ransomware category may be detected. The instances of the second behaviors may be detected, for example, by the behavior tracking module 114. In some embodiments, the instances of the second behaviors are detected based on second events initiated by the CE in the computer system. Such events may be detected, for example, by the event monitoring module 112. In some cases, the tracking module 110 may be configured to ignore the CE initiating the second events and/or engaging in the instances of the second behaviors unless the ransomware category has been assigned to the CE.

At step 450, a potential ransomware subcategory is assigned to the CE based on the detected instances of the second behaviors. The ransomware subcategory may be assigned to the CE, for example, by the subcategorization module 124.

At step 460, a threat score may be assigned to the CE (e.g., the threat score may be initialized or adjusted) based on the potential ransomware category, the potential ransomware subcategory, and/or the detected instances of the second behaviors. The threat score may be determined, for example, by the behavior scoring module 130 based on data provided by the heuristics module 120.

At step 470, a determination is made as to whether the threat score exceeds a threshold score associated with the ransomware category or subcategory assigned to the CE. This determination may be made, for example, by the behavior scoring module 130. If the threat score exceeds the corresponding threshold score, a policy action (e.g., a mitigation action or a protection action) associated with the ransomware category or subcategory assigned to the CE may be initiated. The policy action may be initiated, for example, by the behavior scoring module 130, the policy module 150, and/or the protection and mitigation module 160.

One of ordinary skill in the art will appreciate that the ransomware detection and prevention methods described herein use a variety of concepts to attain low a false negative rate, a low false positive rate, and a very low impact on computer system performance. The term "ransomware" generally refers to a large and diverse set of data-encrypting malware. The techniques used by ransomware may vary greatly: MBR and raw disk encrypting; various strains of file-encrypting; strains targeting specific file types, strains utilizing different file IO and encryption techniques, single CU or multi CU strains, strains utilizing built-in OS tools, strains using different file system discovery techniques, etc. Thus, ransomware detection and protection techniques that are robust and do not significantly degrade system performance are very difficult to devise.

The techniques described herein address this tension by (1) targeting foundational behaviors that are highly likely to be used by any data-encrypting malware, (2) assigning potential ransomware categories and subcategories to computational entities (CEs) based on their behavior and customizing (or tailoring) the detection, protection, and mitigation policies applied to each CE based on those categories and subcategories, and (3) using a rich set of category-specific and subcategory-specific heuristics to increase and decrease the CE's threat score based on the CE's behavior. In this way, the techniques described herein can further increase overall detection confidence, yielding a balanced system suitable for effective ransomware prevention.

Some embodiments of the behavioral security engine 100 may exhibit the following characteristics:

(1) A multi-tier architecture may be used, with a rich set of heuristic methods present in each tier.

(2) An initial categorization tier may be used to analyze a limited, well-defined set of behavioral events for every CE and to categorize potential ransomware into specific high-level categories. This tier may act as pre-filter that filters out obvious non-ransomware while continuing to track any potential ransomware. The pre-filtering may have a variety of benefits. For example, by monitoring high-level types of behavior any file-encrypting malware is highly likely to exhibit, the initial categorization tier ensures that a very high percentage of potential ransomware (e.g., all ransomware) (including zero-day ransomware) passes through the filter, yielding a low false negative rate. Filtering out the non-ransomware also lowers the false positive rate and increases the effectiveness of the more specialized heuristics in the other tiers by filtering out irrelevant events that could otherwise confuse the heuristics or thwart their analysis. As another example, this approach conserves system resources (and reduces the impact on system performance) by reducing the number and types of events that are collected before the first trigger point and limiting the scope of computational analysis done for every CE.

(3) Once the initial high-level category is determined and if further behavioral analysis is warranted to gain confidence, the secondary categorization tier opens up the event stream relevant to that high-level category and adapts the behavioral analysis by selecting algorithms specific to that category to establish a high-confidence sub-category. For example, the actual encryption technique may be identified in this step. The benefit is an adaptive choice of specific lower-level encryption-detection algorithms that are well-suited for the encryption method, which can be an important factor in achieving high accuracy and both low false negative and false positives. This tier can also detect a starting point in a potential encryption of the first data unit, which can trigger the engine to start backing up files and prevent data loss until a prevention action is applied.

(4) Once the specific encryption techniques are identified, another tier of specialized heuristics (for the specific encryption technique) may be used to increase and decrease the CE's threat score. A rich set of heuristics may be used to monitor specific behaviors, patterns and anti-patterns that have a net effect of balancing each other. The use of such methods may increase the confidence in the engine's analysis, further decreasing false positives and false negatives. Also, the system architecture may facilitate easy extensibility and addition of novel methods in this category.

Further Description of Some Embodiments

In some examples, some or all of the processing described above can be carried out on an endpoint device (e.g., a personal computing device, laptop device, tablet device, smartphone device, etc.), on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 5:
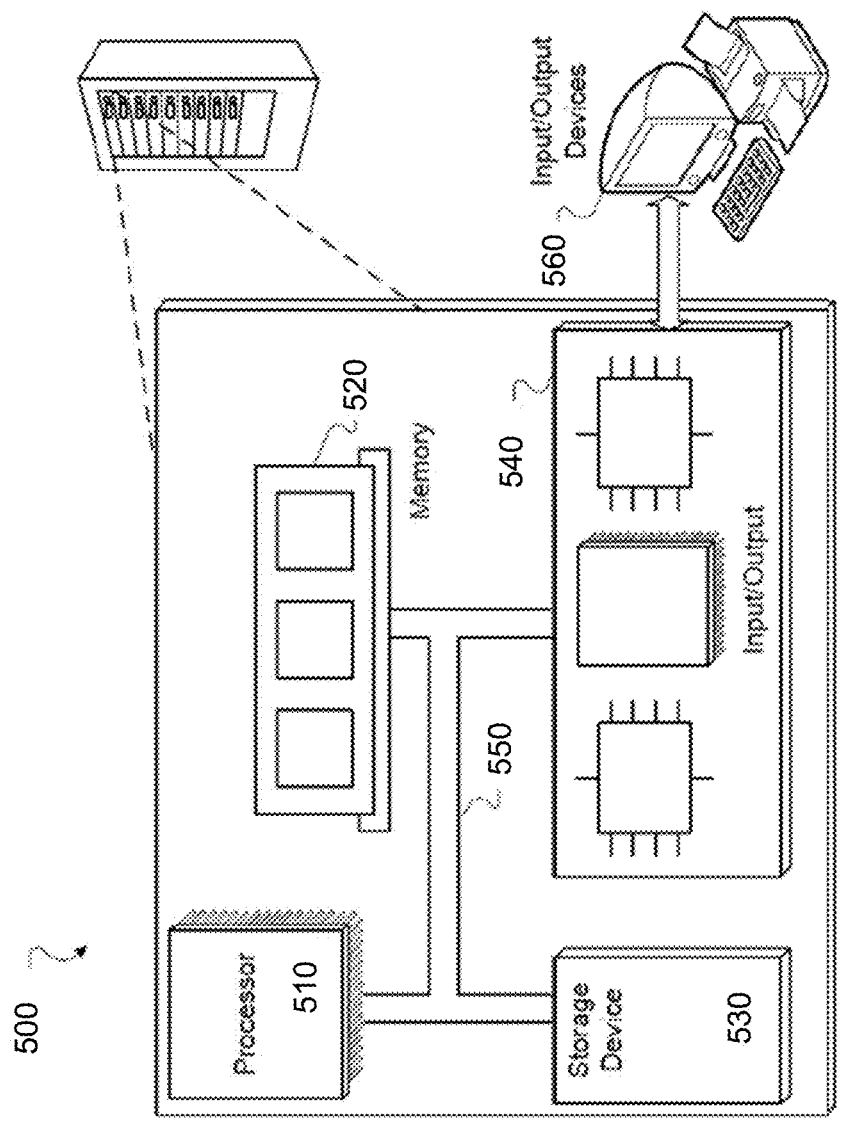
FIG. 5 is a block diagram of an implementation of a computer system.

FIG. 5 is a block diagram of an example computer system 500 that may be used in implementing the technology described in this document. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a nonvolatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-date drive, a flash drive, or some other large capacity storage device. For example, the storage device may store long-term data (e.g., database data, file system data, etc.). The input/output device 540 provides input/output operations for the system 500. In some implementations, the input/output device 540 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 260. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, for example as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B")

can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for ransomware detection, comprising:
    based on first events initiated by a computational entity in a computer system, the computational entity comprising a plurality of related computational units, detecting one or more instances of the computational entity engaging in one or more first behaviors associated with one or more storage resources of the computer system;
    assigning at least one potential ransomware category to the computational entity based on the detected instances of the first behaviors;
    initiating one or more protection actions to protect the one or more storage resources against one or more modification operations,
    based on second events initiated by the computational entity, detecting one or more instances of the computational entity engaging in one or more second behaviors corresponding to the potential ransomware category, the one or more second behaviors comprising attempts by one or more computational units of the plurality of related computational units to access the one or more storage resources;
    enforcing a plurality of policies for the one or more computational units;
    detecting whether the one or more computational units are operating system (OS) components; and
    upon determining that the one or more computational units are OS components, excluding enforcement of at least one policy of the plurality of policies.

2. The method of claim 1, wherein:
    the first behaviors are associated with encrypting a file and include enumerating directories of a file system and/or modifying a private file,
    the first behaviors are associated with encrypting a storage device and include modifying the storage device, and
    the first behaviors are associated with disabling a backup of at least a portion of the computer system and include disabling and/or deleting a backup file, wherein the backup file stores backup data for a plurality of files and/or settings of the computer system.

3. The method of claim 2, wherein detecting the one or more instances of the computational entity enumerating directories of a storage device comprises:
    detecting an enumeration operation initiated by the computational entity on a specified first directory, wherein the specified first directory is (1) a top-level directory of the storage device, (2) a user directory in a file system of the storage device, or (3) an immediate subdirectory of a user directory in the file system of the storage device.

4. The method of claim 1, further comprising:
    traversing a hierarchy of the plurality of related computational units to detect the one or more computational units; and
    based on detecting the one or more computational units, updating a threat score associated with the computational entity.

5. The method of claim 1, further comprising:
    traversing a hierarchy of the plurality of related computational units to detect the one or more computational units and identifying a related computational unit that is not part of an operating system and is not a known verified application; and
    updating the ransomware category based on the identifying.

6. The method of claim 1, wherein assigning the potential ransomware category to the computational entity based on the detected instances of the first behaviors comprises:
    assigning a first category to the computational entity if the detected instances include an instance of the one or more first behaviors associated with encrypting a file;
    assigning a second category to the computational entity if the detected instances include an instance of the one or more first behaviors associated with encrypting a storage device; and
    assigning a third category to the computational entity if the detected instances include an instance of the one or more first behaviors associated with disabling a backup of at least a portion of the computer system.

7. The method of claim 6, wherein:
    the potential ransomware category assigned to the computational entity is the first category,
    the modification operations comprise one or more file modification operations targeting one or more files, and
    the protection actions comprise intercepting the file modification operations and creating backup copies of the files before permitting the file modification operations to modify the files.

8. The method of claim 6, wherein:
    the potential ransomware category assigned to the computational entity is the second category,
    the modification operations comprise one or more storage device modification operations targeting one or more storage devices, and
    the protection actions comprise preventing the storage device modification operations from executing.

9. The method of claim 6, wherein:
    the potential ransomware category assigned to the computational entity is the third category,
    the modification operations comprise one or more file modification operations targeting one or more backup files, and the protection actions comprise intercepting the file modification operations and creating backup copies of the backup files before permitting the file modification operations to modify the backup files.

10. The method of claim 1, further comprising:
assigning at least one potential ransomware subcategory to the computational entity based on the detected instances of the second behaviors.

11. The method of claim 10, further comprising:
assigning a threat score to the computational entity based on the assigned potential ransomware category, the assigned potential ransomware subcategory, and/or the detected instances of the second behaviors.

12. The method of claim 11, further comprising:
assigning the threat score to the computational entity comprises setting the threat score to an initial value based on the assigned potential ransomware category; and
determining whether the assigned threat score exceeds a threshold score associated with the assigned potential ransomware subcategory, and if so, initiating a mitigation action associated with the assigned potential ransomware subcategory.

13. The method of claim 12, wherein the mitigation action comprises one or more of the following: terminating execution of the computational entity, preventing the computational entity from accessing a communication network, preventing the computational entity from modifying the storage resources, and replacing one or more files modified by the computational entity with respective backup files.

14. A computer system comprising:
one or more processing devices and one or more storage devices storing instructions that are operable, when executed by the processing devices, to cause the processing devices to perform operations including:
based on first events initiated by a computational entity in the computer system, the computational entity comprising a plurality of related computational units, detecting one or more instances of the computational entity engaging in one or more first behaviors associated with one or more storage resources of the computer system;
discarding one or more events of the first events initiated by a first computation unit of the plurality of related computational units prior to initiation of execution of other operations associated with the first computation unit;
assigning at least one potential ransomware category to the computational entity based on the detected instances of the first behaviors;
initiating one or more protection actions to protect the one or more storage resources against one or more modification operations,
based on second events initiated by the computational entity, detecting one or more instances of the computational entity engaging in one or more second behaviors corresponding to the potential ransomware category, the one or more second behaviors comprising attempts by one or more computational units of the plurality of related computational units to access the one or more storage resources; and
enforcing a policy for the one or more computational units.

15. The computer system of claim 14, wherein the one or more processing devices and the one or more storage devices storing instructions that are operable, when executed by the processing devices, to cause the processing devices to further perform operations including:
assigning at least one potential ransomware subcategory to the computational entity based on the detected instances of the second behaviors;
assigning a score to the computational entity based on one or more of the following: the assigned potential ransomware category, the assigned potential ransomware subcategory, and the detected instances of the second behaviors; and
determining whether the assigned score exceeds a threshold score associated with the assigned potential ransomware subcategory, and if so, initiating a mitigation action associated with the ransomware subcategory.

16. One or more non-transitory computer readable media embodying instructions for ransomware detection, that when executed by at least one processor, cause the at least one processor to:
based on first events initiated by a computational entity in a computer system, the computational entity comprising a plurality of related computational units, detect one or more instances of the computational entity engaging in one or more first behaviors associated with one or more storage resources of the computer system;
assign at least one potential ransomware category to the computational entity based on the detected instances of the first behaviors;
initiate one or more protection actions to protect the one or more storage resources against one or more modification operations;
based on second events initiated by the computational entity, detect one or more instances of the computational entity engaging in one or more second behaviors corresponding to the potential ransomware category, the one or more second behaviors comprising attempts by one or more computational units of the plurality of related computational units to access the one or more storage resources;
enforce a plurality of policies for the one or more computational units;
determine whether the one or more computational units are operating system (OS) components; and
upon determining that the one or more computational units are OS components, exclude enforcement of at least one policy of the plurality of policies.

17. The one or more non-transitory computer readable media of claim 16, wherein each of the first behaviors is selected from a group comprising enumerating directories of a storage device, modifying a private file, modifying a storage device, and disabling a backup of at least a portion of the computer system.

18. The one or more non-transitory computer readable media of claim 16, wherein the initiated one or more protection actions are associated with the assigned at least one potential ransomware category.

19. The one or more non-transitory computer readable media of claim 16, that when executed by the at least one processor, further cause the at least one processor to:
assign at least one potential ransomware subcategory to the computational entity based on the detected instances of the second behaviors;
assign a score to the computational entity based on one or more of the following: the assigned potential ransomware category, the assigned potential ransomware subcategory, and the detected instances of the second behaviors; and determining whether the assigned score exceeds a threshold score associated with the assigned potential ransomware subcategory, and if so, initiating a mitigation action associated with the assigned potential ransomware subcategory.

20. The one or more non-transitory computer readable media of claim 19, wherein the mitigation action comprises one or more of the following: terminating execution of the computational entity, preventing the computational entity from accessing a communication network, preventing the computational entity from modifying the one or more storage resources of the computer system, replacing one or more files modified by the computational entity with respective backup files.

* * * * *